US012403699B2

(12) United States Patent
Hizawa et al.

(10) Patent No.: US 12,403,699 B2
(45) Date of Patent: Sep. 2, 2025

(54) LIQUID EJECTION APPARATUS

(71) Applicant: SEIKO EPSON CORPORATION, Tokyo (JP)

(72) Inventors: Shunichi Hizawa, Matsumoto (JP); Izumi Nozawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 184 days.

(21) Appl. No.: 18/331,063

(22) Filed: Jun. 7, 2023

(65) Prior Publication Data

US 2023/0398784 A1 Dec. 14, 2023

(30) Foreign Application Priority Data

Jun. 8, 2022 (JP) ................................ 2022-092784

(51) Int. Cl.
*B41J 2/175* (2006.01)

(52) U.S. Cl.
CPC ................................ *B41J 2/17523* (2013.01)

(58) Field of Classification Search
CPC .... B41J 2/175; B41J 2/17506; B41J 2/17509; B41J 2/1752; B41J 2/17523; B41J 2/17526; B41J 29/02; B41J 29/13; B41J 29/38
See application file for complete search history.

(56) References Cited

U.S. PATENT DOCUMENTS

2003/0007047 A1* 1/2003 Otsuka ................ B41J 2/17513 347/89
2012/0050358 A1* 3/2012 Kitabatake ........... B41J 2/17556 347/92
2013/0235133 A1* 9/2013 Watanabe .................. B41J 2/19 347/92
2015/0062231 A1* 3/2015 Danzuka .................. B41J 29/38 347/19
2020/0062000 A1 2/2020 Tojo
2020/0316973 A1 10/2020 Toki
2022/0063277 A1 3/2022 Tanaka

FOREIGN PATENT DOCUMENTS

JP 2020-032533 A 3/2020
JP 2020-168842 A 10/2020
JP 2022-041754 A 3/2022

* cited by examiner

*Primary Examiner* — Anh T Vo
(74) *Attorney, Agent, or Firm* — WORKMAN NYDEGGER

(57) ABSTRACT

A liquid ejection apparatus includes a liquid ejection section configured to print by discharging a liquid from a nozzle, a liquid container having an accommodation chamber that stores liquid and an injection port that communicates with the accommodation chamber and into which the liquid is configured to be injectable from the outside, a supply flow path communicating between the liquid ejection section and the liquid container, and an opening and closing mechanism. The opening and closing mechanism that is configured to switch such that an open state in which the supply flow path is opened and a closed state in which the supply flow path is closed when power is turned on and not to switch when power is turned off.

14 Claims, 13 Drawing Sheets

| SWITCHING POSITION | FIRST SWITCHING POSITION | SECOND SWITCHING POSITION | THIRD SWITCHING POSITION | FOURTH SWITCHING POSITION |
|---|---|---|---|---|
| FIRST OPENING AND CLOSING SECTION 41 | OPEN | CLOSE | OPEN | CLOSE |
| SECOND OPENING AND CLOSING SECTION 42 | OPEN | OPEN | CLOSE | CLOSE |

LIQUID EJECTION APPARATUS

The present application is based on, and claims priority from JP Application Serial Number 2022-092784, filed Jun. 8, 2022, the disclosure of which is hereby incorporated by reference herein in its entirety.

BACKGROUND

1. Technical Field

The present disclosure relates to a liquid ejection apparatus including a liquid ejection section that ejects liquid.

2. Related Art

JP-A-2020-168842 discloses a liquid ejection apparatus including a liquid ejection section for ejecting liquid. The liquid ejection apparatus includes a liquid container for containing liquid, a liquid ejection section for ejecting the liquid, and a supply flow path for supplying the liquid from the liquid container to the liquid ejection section. In addition, the liquid ejection apparatus includes an opening and closing mechanism having a manually operated lever capable of opening and closing the supply flow path. A user, a repairman, or the like can operate to close the supply flow path when necessary by operating the lever of the opening and closing mechanism. For example, when the liquid ejection apparatus is transported, the lever is operated to close the supply flow path.

However, in the liquid ejection apparatus described in JP-A-2020-168842, when a user, a transporter, a repairman, or the like intentionally or erroneously operates a manual operation section such as a lever with respect to the liquid ejection apparatus in a power-off state, the liquid ejection apparatus is transported in a state in which the supply flow path is opened. In this case, there is a risk that liquid such as ink may leak from the liquid ejection section during transportation. As described above, in the related liquid ejection apparatus, there is a problem that a malfunction occurs because a manual operation can be performed intentionally or erroneously with respect to the liquid ejection apparatus in the power-off state.

SUMMARY

A liquid ejection apparatus that solves the above problem includes a liquid ejection section configured to print by ejecting a liquid from a nozzle, a liquid container including an accommodation chamber configured to store liquid and an injection port that communicates with the accommodation chamber and that is configured to be injected with liquid from outside, a supply flow path communicating between the liquid ejection section and the liquid container, and an opening and closing mechanism configured to, when power is turned on, enable, and, when power is turned off, disable switching between an open state, in which the supply flow path is open, and a closed state, in which the supply flow path is closed.

BRIEF DESCRIPTION OF THE DRAWINGS

FIG. 4 is a perspective view showing a liquid container, an opening and closing mechanism, a liquid ejection section, a carriage, and the like.

FIG. 5 is a schematic diagram illustrating a liquid container, a supply flow path, an atmosphere communication flow path, an opening and closing mechanism, a liquid ejection section, and the like.

DESCRIPTION OF EMBODIMENTS

Hereinafter, a liquid ejection apparatus according to an embodiment will be described with reference to the drawings.

Figure 1:
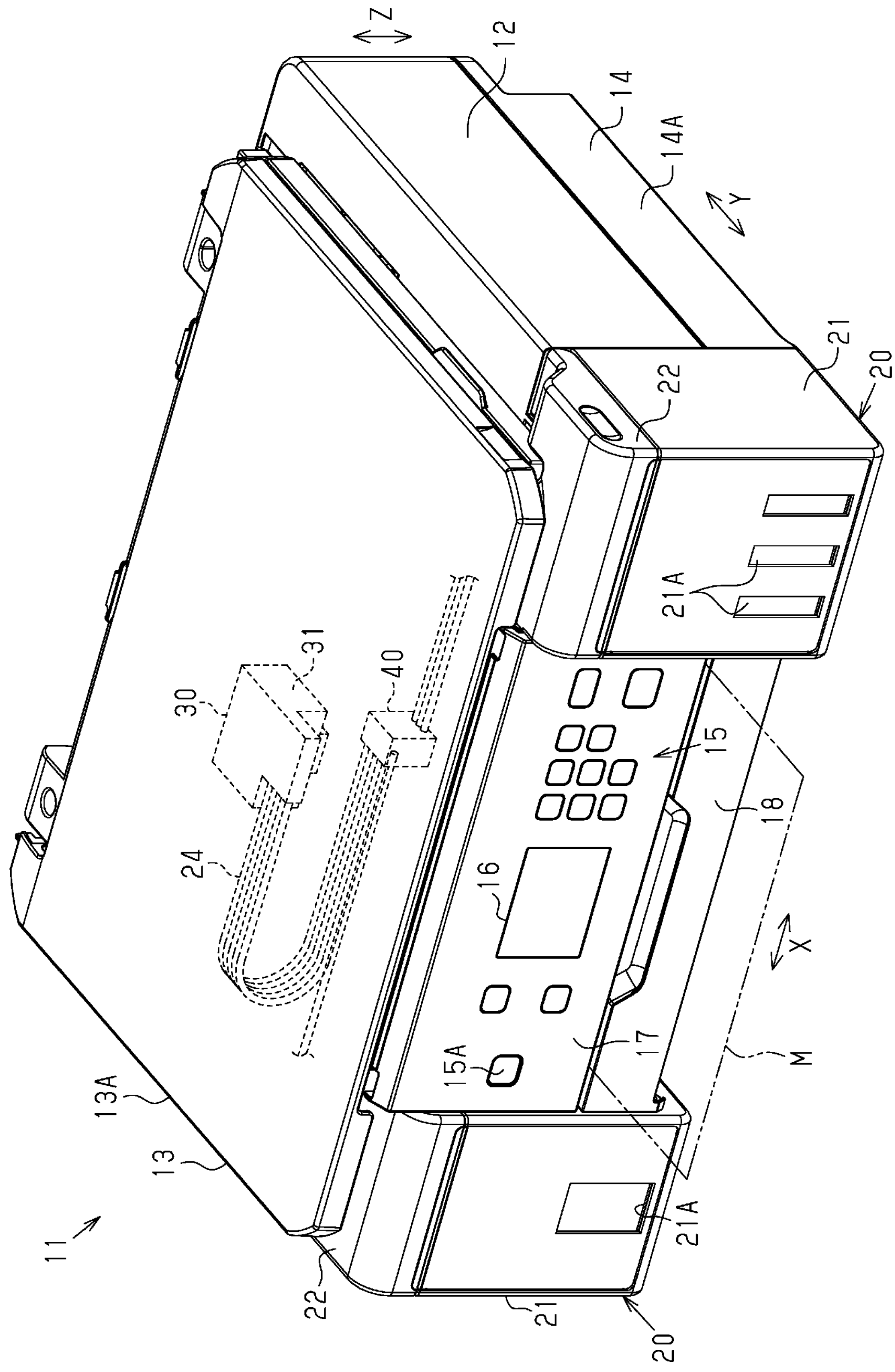
FIG. 1 is a perspective view showing a liquid ejection apparatus according to an embodiment.

As shown in FIG. 1, a liquid ejection apparatus 11 includes a printing section 12 for printing on a medium M, such as paper, and a scanner 13 for reading an original (not shown). The scanner 13 is disposed above the printing section 12. The liquid ejection apparatus 11 includes a device main body 14 constituting the printing section 12. The device main body 14 has an opening opened upward in the upper portion thereof. The scanner 13 functions as an openable and closable cover 13A that covers the opening of the device main body 14.

In FIG. 1, assuming that the liquid ejection apparatus 11 is placed on a horizontal plane, a direction along a gravity direction is defined as a vertical direction Z, and directions along the horizontal plane are defined as a width direction X and a depth direction Y. That is, the width direction X, the depth direction Y, and the vertical direction Z intersect with each other (preferably orthogonally). In addition, one end side in the depth direction Y may be referred to as a front surface side or a front side, the other end side opposite to the one end side may be referred to as a back surface side or a rear side, one end side in the width direction X as viewed from the front surface side may be referred to as a right side, and the other end side may be referred to as a left side. In addition, since the width direction X is also a main scanning direction in which a liquid ejection section 31 mounted on a carriage 30 (to be described later) moves at the time of printing, the width direction X is also referred to as the main scanning direction X. In this case, a direction parallel to and opposite to the depth direction Y in which the medium M is transported at the printing position, which faces the liquid ejection section 31, is also referred to as a transport direction −Y or a sub-scanning direction −Y.

Figures 12, 13:
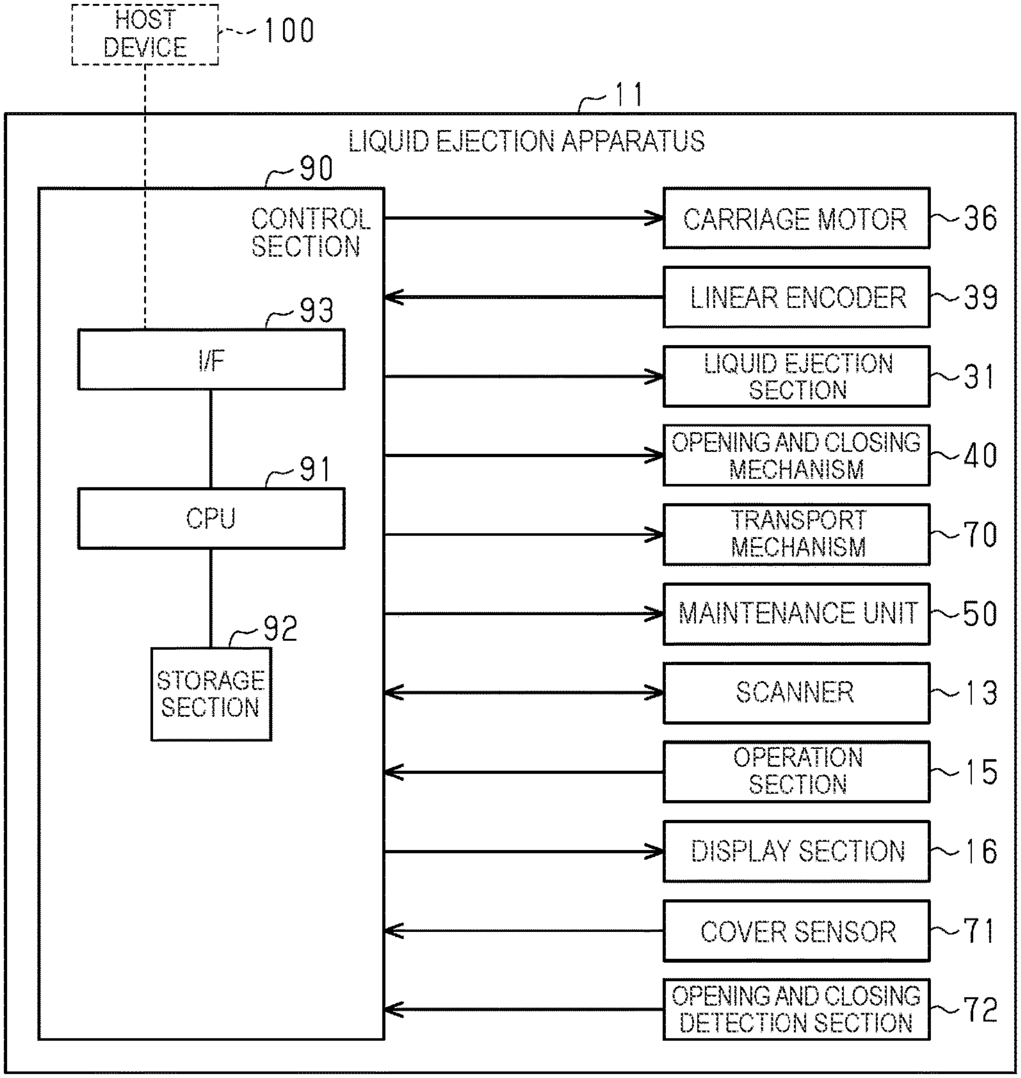
FIG. 12 is a block diagram showing an electrical configuration of the liquid ejection apparatus.
FIG. 13 is a table showing four switching positions of the opening and closing mechanism.

As shown in FIG. 1, the device main body 14 includes the liquid ejection section 31, the carriage 30, a transport mechanism 70 (refer to FIG. 12), liquid storage units 20, supply flow paths 24, an opening and closing mechanism 40, and a control section 90 (refer to FIG. 12).

The device main body 14 includes a housing 14A, which is the exterior case of the device main body 14. The liquid ejection section 31, the carriage 30, the supply flow paths 24, the opening and closing mechanism 40, the transport mechanism 70, and the control section 90 are disposed in the housing 14A. The liquid storage units 20 are disposed on both sides in the width direction X in the front portion of the housing 14A.

Each liquid storage unit 20 includes a container case 21 and a cover 22 that covers an opening of the container case 21. Each container case 21 accommodates liquid containers 23 (see FIGS. 2 and 3) for accommodating a liquid. Each cover 22 is provided so as to be openable and closable with respect to the container case 21. More specifically, each cover 22 is configured to be displaceable between a cover position shown in FIG. 1 for covering the liquid containers 23 and an exposed position shown in FIG. 2 for exposing the liquid containers 23. The liquid ejection apparatus 11 includes, for example, cover sensors 71 (refer to FIG. 12) as an example of displacement detection units that detect displacement of each cover 22. For example, a user or the like displaces the cover 22 from the cover position to the exposed position when refilling the liquid to the liquid containers 23. The displacement of the cover 22 is detected by the cover sensor 71. The control section 90 can detect the displacement of the cover 22 by the detection signal of the cover sensor 71.

As shown in FIG. 1, an operation panel 17 including an operation section 15, such as buttons operated to give various instructions to the liquid ejection apparatus 11, and a display section 16 that displays information such as a menu, is provided on the front side of the liquid ejection apparatus 11. The display section 16 is configured by, for example, a liquid crystal display panel. When the display section 16 is a touch panel, a touch operation function of the display section 16 may constitute a part of the operation section 15. The operation section 15 includes a power operation section 15A that is operated when turning on and off the power of the liquid ejection apparatus 11.

As shown in FIG. 1, a medium accommodation section 18 that accommodates the medium M is attachably and detachably inserted into a lower portion of the device main body 14. The medium accommodation section 18 is, for example, a cassette capable of storing the medium M. The plurality of media M stored in the medium accommodation section 18 are fed one sheet at a time along a predetermined transport path. The medium M is transported in the transport direction −Y through a transport region FA (refer to FIG. 4) that has a width dimension that is slightly narrower than the width dimension of the medium accommodation section 18 in the width direction X. In a process in which the medium M is transported in the transport region FA, the liquid is ejected to the medium M by the liquid ejection section 31. The medium accommodation section 18 is not limited to a single level, and may be provided as a plurality of levels. The supply source of the medium M is not limited to the medium accommodation section 18 such as a cassette, and it may be a medium mounting section including a tray on which one or a plurality of media M can be placed.

The scanner 13 is configured to be rotatable with respect to the device main body 14 with a rear surface side of the device main body 14 as a rotation fulcrum. The scanner 13 is rotatable between a closed posture (refer to FIG. 1) and an open posture (refer to FIG. 2) with respect to the device main body 14. The scanner 13 functioning as the cover 13A can open and close the device main body 14 between a cover position at which the scanner 13 covers the inside of the device main body 14 and an exposed position at which the inside of the device main body 14 is exposed. The liquid ejection apparatus 11 may not include the scanner 13. Instead of the scanner 13, a simple cover 13A that covers the opening of the device main body 14 from the upper surface may be provided.

Figure 2:
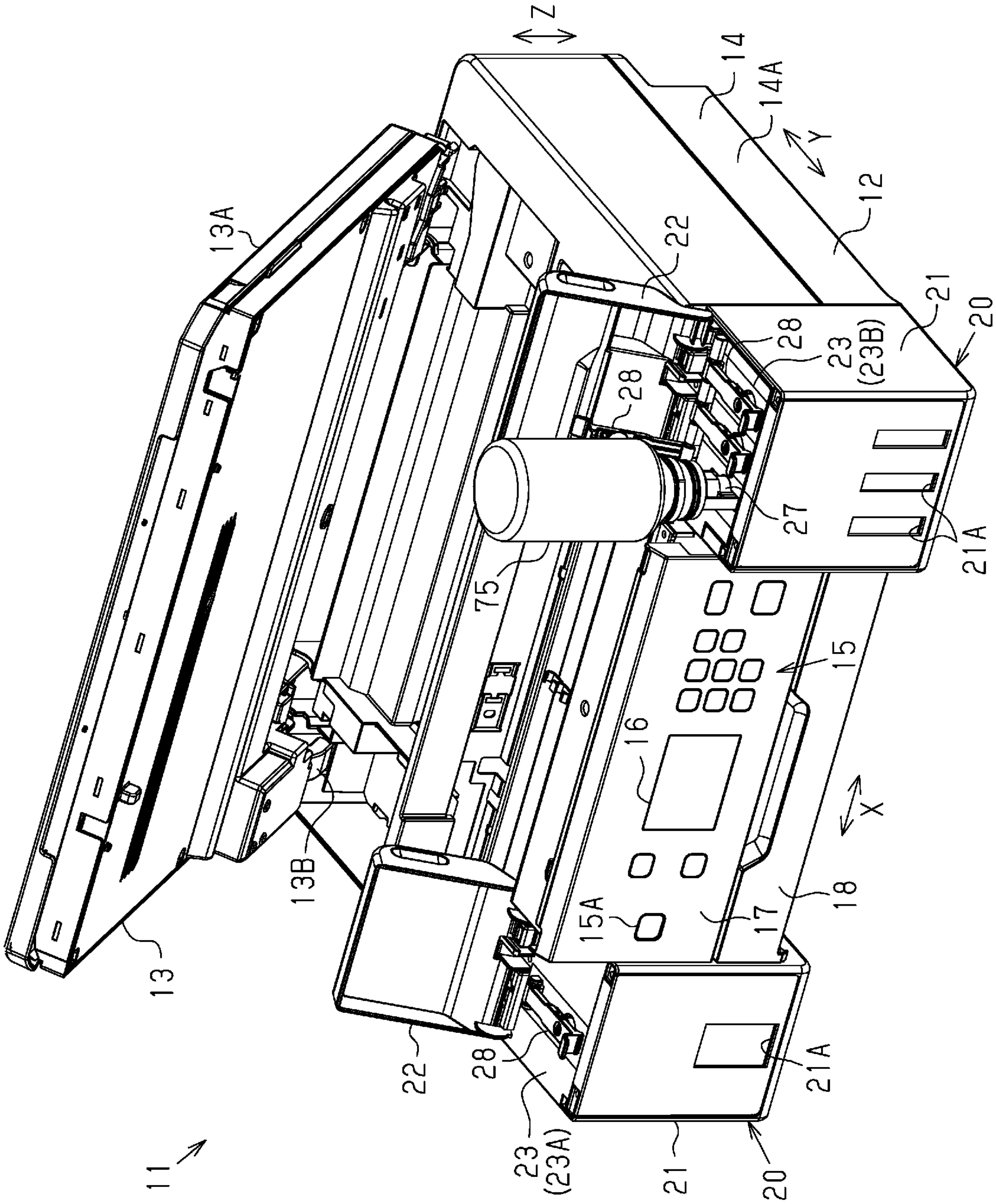
FIG. 2 is a perspective view of the liquid ejection apparatus showing how the liquid is injected into the liquid container.

As shown in FIG. 2, the scanner 13 is attached via a rotation mechanism 13B such as a hinge provided on the back surface side. The scanner 13 can open and close with respect to the printing section 12, and rotates between a closed position shown in FIG. 1 and an open position shown in FIG. 2.

As shown in FIG. 1, in a state in which the cover 13A is closed, a part of the cover 13A covers a part of the cover 22 in the closed state. Therefore, in order to open the cover 22, it is necessary to first open the cover 13A. When the cover 13A is rotated to the open position, the cover 22 of the liquid storage units 20 can open and close. The cover 22 is configured to be displaced between a cover position at which the liquid containers 23 are covered and an exposed position at which the liquid containers 23 are exposed. Note that the cover 22 may be omitted, and the cover 13A may be configured to be displaced between a cover position at which the cover covers the liquid containers 23 and an exposed position at which the liquid containers 23 are exposed.

The liquid containers 23 are each provided with an injection section 27 having an injection port 27A at its upper part and a lid member 28 capable of stoppering the injection port 27A at a closed position. The lid member 28 is configured to be displaced between the closed position in which the injection section 27 is stoppered and an open position in which the injection section 27 is not stoppered. When the cover 22 is rotated to the exposed position (open position), the lid member 28 can open and close. When the liquid is supplied to a liquid container 23, as shown in FIG. 2, the scanner 13, the cover 22, and the lid member 28 are sequentially rotated to the open position, and a liquid bottle 75 filled with the liquid is coupled to the injection section 27 of the liquid container 23 in an inverted posture. The liquid in the liquid bottle 75 is injected into the liquid container 23 via the injection section 27.

Two liquid storage units 20 in this example are disposed on both sides of the operation panel 17 in the width direction X. Here, the operation panel 17 is disposed in substantially the same region as the transport region FA of the medium M in the width direction X. For this reason, the plurality of liquid containers 23 are separately disposed on both sides of the transport region FA of the medium M.

Figure 3:
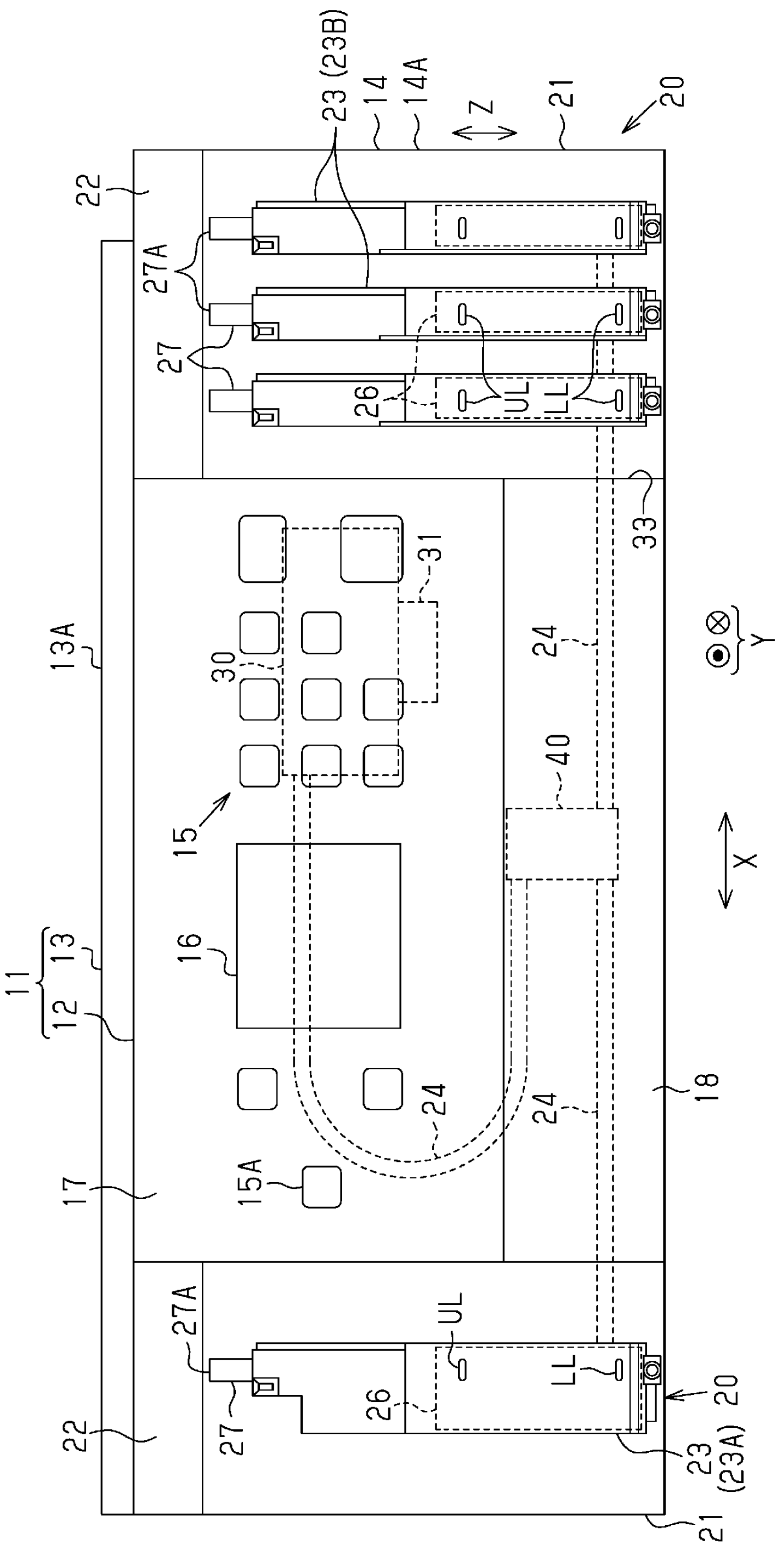
FIG. 3 is a front view of the liquid ejection apparatus, partially broken away so that the liquid container can be seen.

As shown in FIGS. 2 and 3, one liquid storage unit 20 contains three liquid storage sections 23, and the other liquid storage unit 20 contains one liquid container 23. Three liquid containers 23 in the one liquid storage unit 20 contain, for example, color ink used at the time of color printing, as an example of liquid. For example, inks of three colors of cyan, magenta, and yellow are respectively stored in the three liquid containers 23. For example, black ink used at the time of monochrome printing or the like is stored as an example of liquid in one liquid container 23 in the other liquid storage unit 20. The ink may be either a pigment type or a dye type.

In the liquid ejection apparatus 11, a first liquid container 23A and a second liquid container 23B having different liquid amount capacities are attached side by side in the widthwise direction X. In the present embodiment, one first liquid container 23A for black having a large capacity is provided on the left side with respect to the operation panel 17, and the three second liquid containers 23B, for color, having a smaller capacity than the first liquid container 23A, are provided on the right side with respect to the operation panel 17. Note that the plurality of second liquid containers 23B have the same configuration, and the same reference numerals are given to configurations that are common between the first liquid container 23A and the second liquid containers 23B, and duplicate description thereof will be omitted.

The volume of the first liquid container 23A accommodating black ink is larger than the volume of the second liquid container 23B accommodating color ink. This is because the amount of liquid consumption is greater for black ink than for the color ink. In the example shown in FIGS. 2 to 4, one first liquid container 23A for containing black ink and the plurality (for example, three) of the second liquid containers 23B for containing color ink are disposed on the left and right sides separately, but the way to divide and arrange the plurality of liquid containers 23 on the left and right can be appropriately changed.

The container case 21 constituting the liquid storage unit 20 is provided with window sections 21A at positions corresponding to the liquid containers 23. A user can visually check the residual amount of the liquid in the liquid containers 23 through the window sections 21A.

As shown in FIG. 3, each liquid container 23 has an accommodation chamber 26 holding liquid, and the injection port 27A that communicating with the accommodation chamber 26 and into which liquid can be injected from the outside. Note that the first liquid container 23A and the second liquid containers 23B have basically the same configuration except that their widths are slightly different due to their different volumes.

Each liquid container 23 shown in FIG. 3 is at least partially made of transparent or translucent resin, and the liquid level of the liquid accommodated in the accommodation chamber 26 can be visually checked from the outside. The window sections 21A of the container cases 21 (refer to FIG. 1) function as a viewer surface through which liquid in the liquid containers 23 can be visually checked from outside. The window section 21A is provided with a lower limit mark LL for gauging the lower limit when the liquid needs to be replenished in the accommodation chamber 26, and an upper limit mark UL for gauging the upper limit of the replenishing amount of the liquid. Note that the viewer surface is provided along the vertical direction Z in the use state of the first liquid container 23A.

Further, the upper limit mark UL may be provided on the window sections 21A instead of the liquid containers 23, for example, the window section 21A may be formed as a light transmitting portion that transmits light by a transparent or translucent member. It is also possible not to provide the upper limit mark UL.

Figure 10:
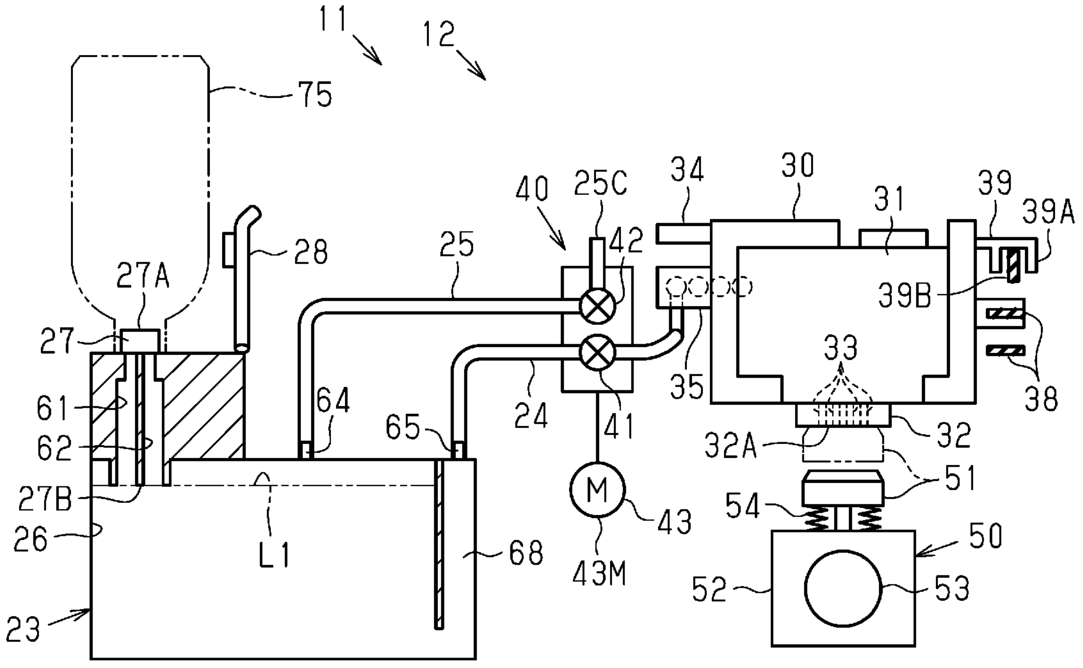
FIG. 10 is a schematic diagram showing a configuration of a liquid container, a flow path, an opening and closing mechanism, and a liquid ejection section.

Further, the liquid ejection apparatus 11 shown in FIG. 1 includes the liquid ejection section 31 in the housing 14A, for performing printing by ejecting liquid from nozzles 33 (refer to FIG. 10). The liquid ejection apparatus 11 includes the supply flow paths 24 having tubes or the like for supplying the liquid contained in the liquid containers 23 to the liquid ejection section 31. The liquid ejection apparatus 11 includes the carriage 30 on which the liquid ejection section 31 is mounted and which can reciprocate along the main scanning direction X. The liquid ejection section 31 includes a liquid ejection head 32 (refer to FIGS. 4 and 10) that ejects liquid from the nozzles 33. The liquid ejection section 31 ejects liquid toward the medium M from the nozzles 33 of the liquid ejection head 32 while moving in the main scanning direction X, thereby printing characters, images, or the like on the medium M.

As shown in FIGS. 1 and 3, the liquid ejection apparatus 11 includes the supply flow paths 24 that bring the liquid ejection section 31 and the liquid containers 23 into communication with each other. The supply flow paths 24 are, for example, tubes. The liquid ejection apparatus 11 includes the opening and closing mechanism 40 configured to open and close the supply flow paths 24.

Further, each liquid container 23 has an atmosphere communication flow path 25 capable of bringing the inside of the accommodation chamber 26 into communication with atmosphere. The opening and closing mechanism 40 is configured to open and close the atmosphere communication flow paths 25. The supply flow paths 24 and the atmosphere communication flow paths 25 are coupled to the opening and closing mechanism 40. Through the opening and closing mechanism 40, the supply flow paths 24 are coupled to the liquid ejection section 31 by a predetermined flow path route that turns back with a curve along the way in the width direction X. The supply flow paths 24 have a configuration of four tubes for supplying four colors of ink, bundled horizontally adjacent to each other.

In addition, the opening and closing mechanism 40 is configured such that an open state, in which the supply flow paths 24 are open, and a closed state, in which the supply flow paths 24 are closed, can be switched between when the power is on and cannot be switched between when the power is off. The liquid ejection apparatus 11 is configured to enable selection of a first mode in which, when power is turned off, power is turned off with the opening and closing mechanism 40 in the open state and a second mode in which, when power is turned off, power is turned off with the opening and closing mechanism 40 in the closed state.

As shown in FIGS. 1 and 3, the liquid ejection apparatus 11 includes the carriage 30 on which the liquid ejection section 31 is mounted and which is movable in the main scanning direction X.

Internal Configuration of the Printing Section 12

Figure 4:
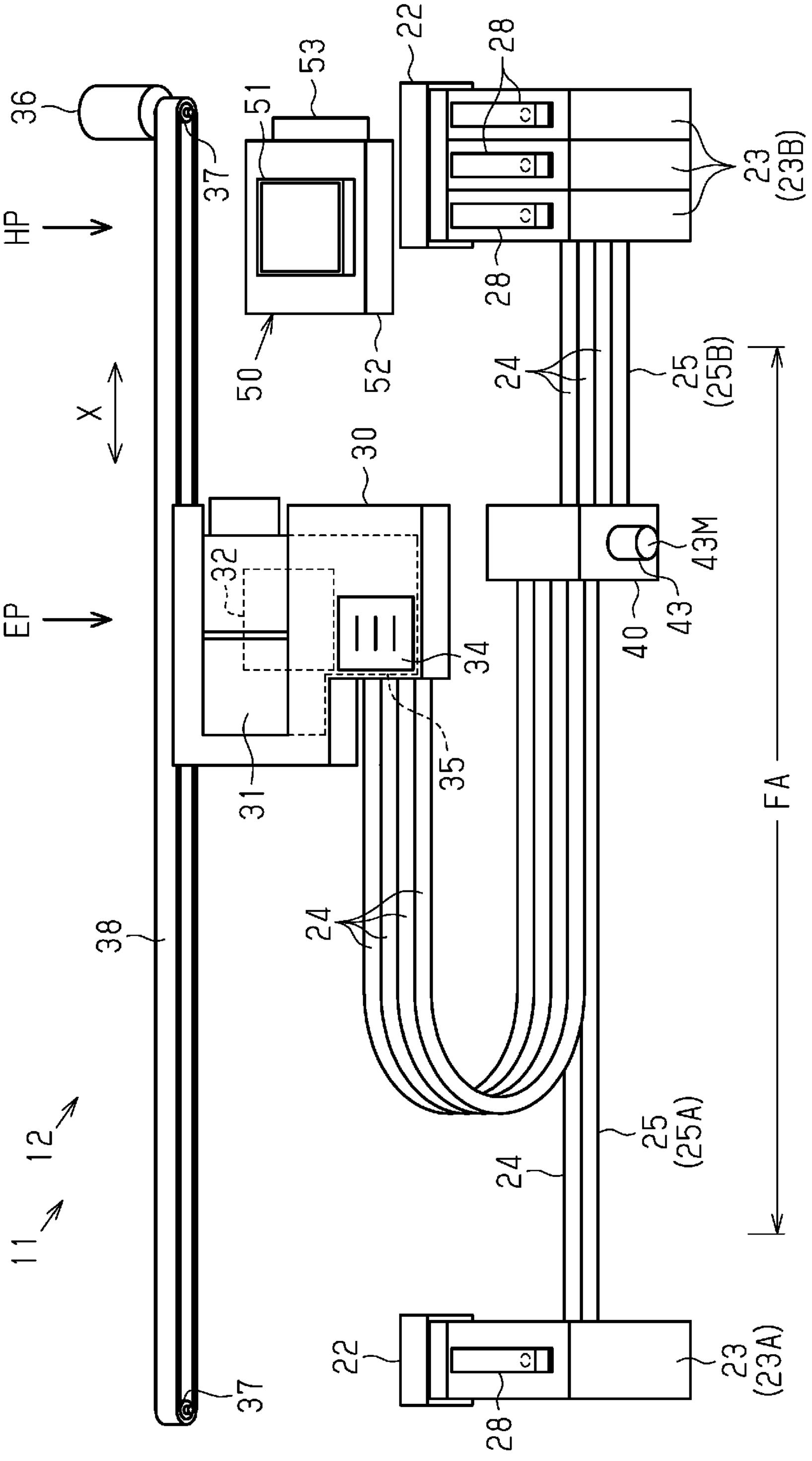

Next, internal configuration of the printing section 12 will be described with reference to FIG. 4. As shown in FIG. 4, the carriage 30 can reciprocate in the main scanning direction X by a driving force applied from a carriage motor 36. The liquid ejection section 31 is mounted on the carriage 30.

An endless timing belt 38 wound around a pair of pulleys 37 extends along the main scanning direction X on the back side of the movement path of the carriage 30. A driving pulley of the pair of pulleys 37 is fixed to a rotation shaft (not illustrated) of the carriage motor 36. At least a part of the timing belt 38 is fixed to a back side end portion of the carriage 30. When the carriage motor 36 is driven in forward and reverse directions, the timing belt 38 rotates in the same direction as the rotation direction of the carriage motor 36, and causes the carriage 30 to reciprocate in the main scanning direction X.

The carriage 30 shown in FIG. 4 reciprocates along a guide shaft (not shown) extending in the main scanning direction X. The carriage 30 waits at a standby position HP (home position) during non-printing. A maintenance unit 50 for performing maintenance of the liquid ejection section 31 is disposed immediately below the carriage 30 that moved to the standby position HP. The maintenance unit 50 includes a cap 51 as an example of a closed space formation section that forms a closed space in which the nozzles 33 open at a standby position HP in which the liquid ejection section 31 can wait. The cap 51 can abut on the liquid ejection section 31, for example, so as to surround the nozzles 33. In addition, the maintenance unit 50 includes a pump 53 that reduces the pressure of a closed space that is formed when the cap 51 abuts on a nozzle surface 32A (refer to FIG. 10) in which the nozzles 33 of the liquid ejection head 32 are opened. When the closed space formed by the cap 51 abutting on the nozzle surface 32A is decompressed, cleaning of the nozzles 33 for discharging unnecessary ink and air bubbles in the nozzles 33 is performed.

In the liquid ejection apparatus 11 of the present embodiment, a liquid receiving section (not illustrated) is provided directly below the carriage 30 when the carriage 30 moves to a non-printing region that is located on both sides of a transport region FA (printing region) in the main scanning direction X. The liquid receiving section receives ink discharged from the nozzles 33 by dummy ejection, which is a type of maintenance. Dummy ejections are for driving the piezoelectric element to discharge ink that is not used for printing from the nozzles 33 and eliminate thickening of ink in the nozzle 33. The cap 51 may also serve as the liquid receiving section.

Further, the liquid ejection apparatus 11 has the transport mechanism 70 (refer to FIG. 12) including a plurality of rollers for transporting the sheet-like medium M. The transport mechanism 70 transports the medium M in a transport direction −Y that intersects with the main scanning direction X, which is the moving direction of the carriage 30 (liquid ejection section 31). A support base (platen) (not shown) is provided so as to face the liquid ejection head 32 below the range in which the liquid ejection section 31 moves. The support base supports the medium M transported by the transport mechanism 70. The liquid ejection section 31 prints an image or the like on the medium M by ejecting liquid such as ink onto a portion of the medium M that is transported in the transport region FA and that is supported by the support base.

With respect to the positional relationship between the liquid containers 23 and the liquid ejection section 31, the liquid surface in the liquid containers 23 is provided at a position lower than the nozzle 33 of the liquid ejection section 31 by a predetermined height in the vertical direction Z. That is, a negative pressure due to a water head difference by a predetermined height is applied to the nozzles 33.

The liquid ejection section 31 shown in FIG. 4 is provided so as to be attachable to and detachable from the carriage 30. One end of each supply flow path 24 is provided so as to be attachable to and detachable from the liquid ejection section 31. The liquid ejection section 31 includes a joint section 35 coupled to the supply flow paths 24.

The liquid ejection section 31 of present embodiment is configured to be replaceable with respect to the carriage 30. The carriage 30 is provided with an attach and detach operation section 34 rotatably supported around a shaft. A user can attach and detach the liquid ejection section 31 to and from the carriage 30 by operating the attach and detach operation section 34. The attachment and detachment work of the liquid ejection section 31 is performed at an exchange position EP illustrated in FIG. 4 in a state in which the cover 13A including the scanner 13 is opened. The exchange position EP is a position different from the standby position HP in the main scanning direction X. In response to a command to replace the liquid ejection section 31, the carriage 30 moves from the standby position HP to the exchange position EP.

As shown in FIG. 4, the joint section 35 is a member that couples the supply flow paths 24 and the flow path of the liquid ejection section 31. The joint section 35 is provided, for example, in the attach and detach operation section 34. When the user operates the attach and detach operation section 34 in an opening direction in order to detach the liquid ejection section 31 from the carriage 30, the joint section 35 is detached from the liquid ejection section 31. By this, the supply flow paths 24 and the liquid ejection section 31 are separated from each other. Then, the liquid ejection section 31 can be detached from the carriage 30 in a state of being separated from the supply flow paths 24. In addition, when the user attaches the liquid ejection section 31 to the carriage 30, the attach and detach operation section 34 is closed, and a pressing unit (not illustrated) is pressed. Accordingly, the connection between the joint section 35 and the liquid ejection section 31 is realized. Due to the connection between the joint section 35 and the liquid ejection section 31, the supply flow paths 24 and the flow path of the liquid ejection section 31 communicate with each other again, and the liquid can be supplied to the liquid ejection head 32.

About the Opening and Closing Mechanism 40

Figure 5:
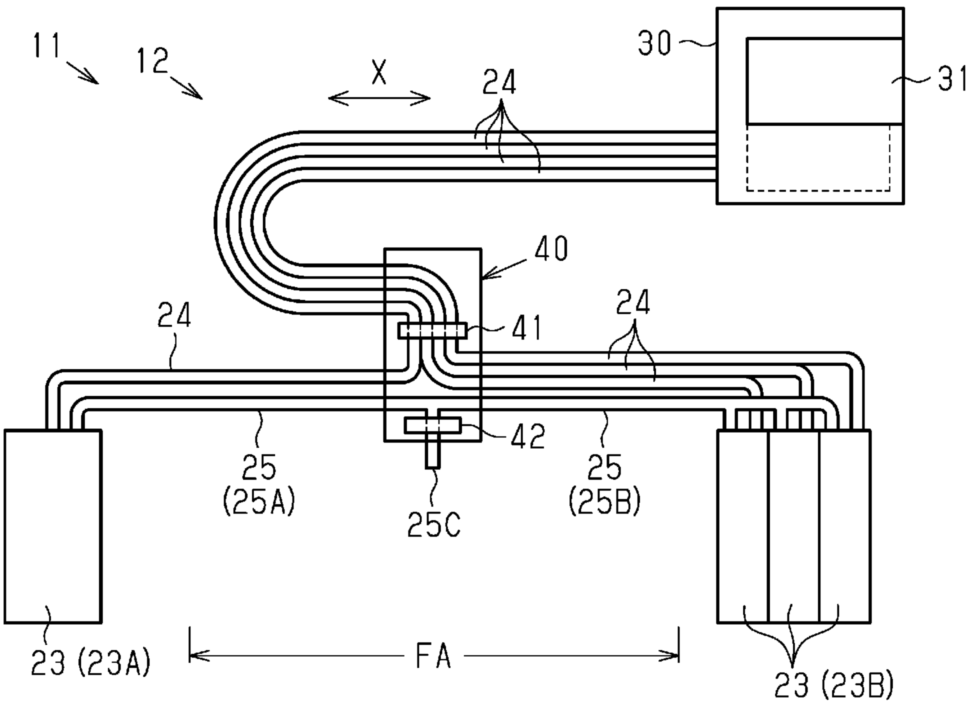

Next, a detailed configuration of the opening and closing mechanism 40 will be described with reference to FIGS. 4 and 5. As shown in FIG. 5, the opening and closing mechanism 40 includes a first opening and closing section 41 and a second opening and closing section 42. As shown in FIG. 4, the opening and closing mechanism 40 includes a drive mechanism 43 that outputs a driving force for opening and closing the flow paths 24 and 25. The drive mechanism 43 includes a motor 43M as a drive section. The first opening and closing section 41 shown in FIG. 5 is configured to open and close the supply flow paths 24. Further, the second opening and closing section 42 is configured to open and close the atmosphere communication flow paths 25. The control section 90 drives and controls the motor 43M to control the opening and closing state of the first opening and closing section 41 and the second opening and closing section 42.

A state in which the opening and closing mechanism 40 closes only the supply flow paths 24 and a state in which the opening and closing mechanism 40 closes only the atmosphere communication flow paths 25 can be selected. When the first opening and closing section 41 is closed and the second opening and closing section 42 is open, then the opening and closing mechanism 40 closes only the supply flow paths 24 out of the supply flow paths 24 and the atmosphere communication flow paths 25. When the first opening and closing section 41 is open and the second opening and closing section 42 is closed, then the opening and closing mechanism 40 closes only the atmosphere communication flow paths 25 out of the supply flow paths 24 and the atmosphere communication flow paths 25. In the opening and closing mechanism 40 of the present embodiment, there are four combinations of open and closed states of the supply flow paths 24 and the atmosphere communication flow paths 25. The combination of the open and closed states may be two or three.

Detailed Configuration of the Opening and Closing Mechanism 40

Figure 6:
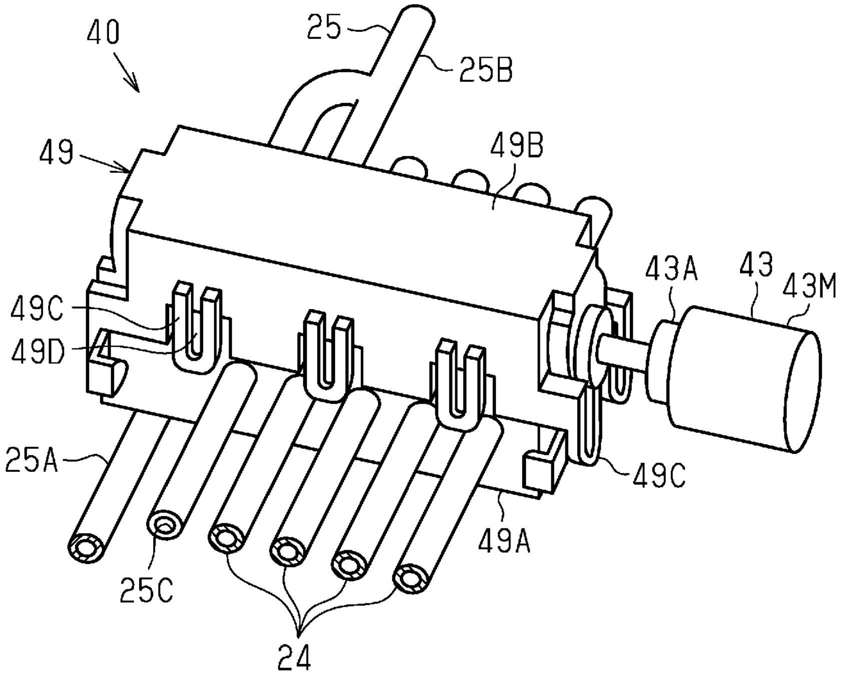
FIG. 6 is a perspective view showing the opening and closing mechanism.
Figure 7:
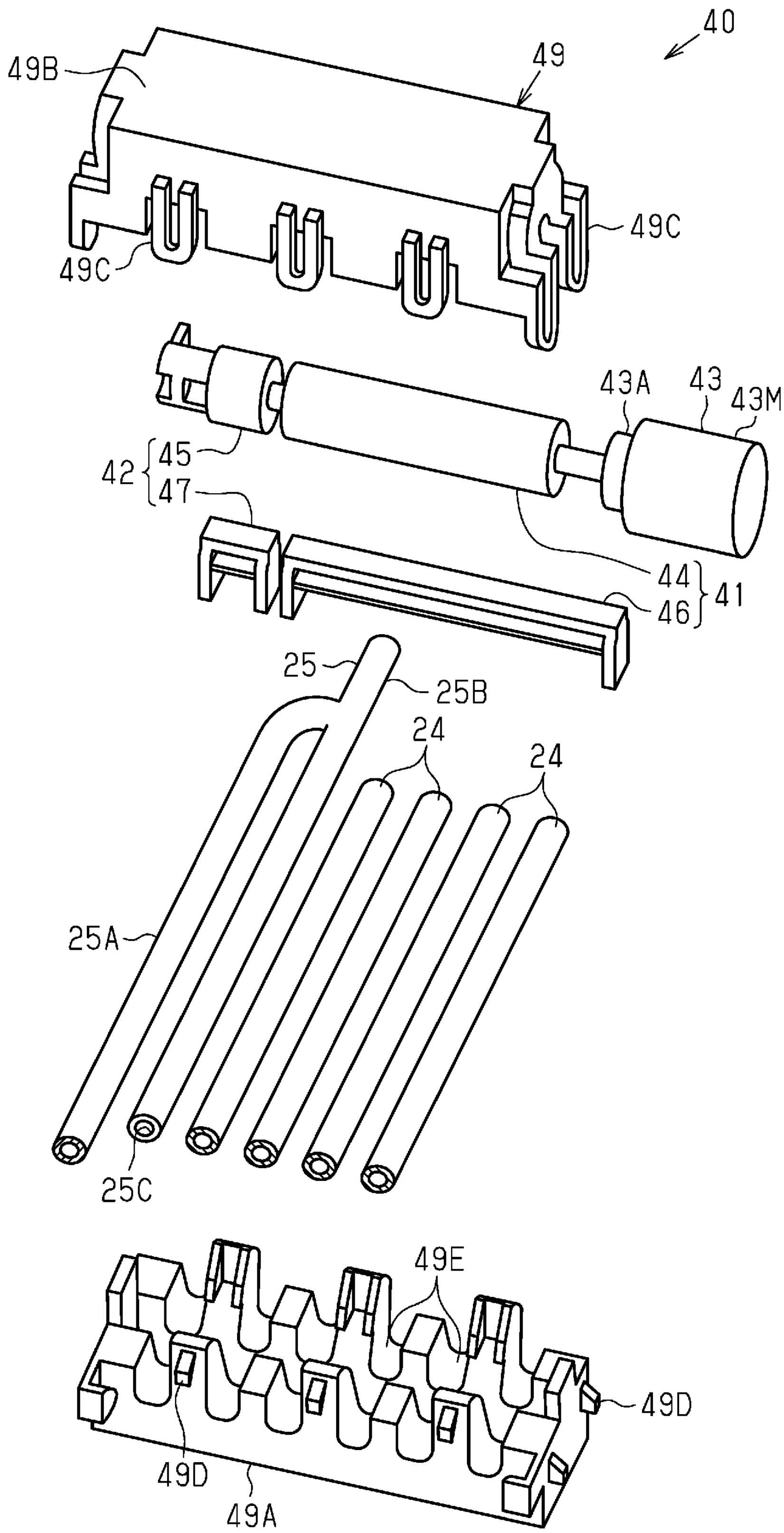
FIG. 7 is an exploded perspective view of the opening and closing mechanism.

Next, detailed configuration of the opening and closing mechanism 40 will be described with reference to FIGS. 6 and 7. FIG. 6 is a perspective view of the opening and closing mechanism 40. FIG. 7 is an exploded perspective view of the opening and closing mechanism 40.

The liquid ejection apparatus 11 includes the motor 43M configured to drive the opening and closing mechanism 40.

As illustrated in FIG. 7, the opening and closing mechanism 40 includes, as the first opening and closing section 41 capable of opening and closing the supply flow paths 24, a first pressing member 46 capable of pressing the supply flow paths 24 and a first cam 44 configured to switch a pressing state of the first pressing member 46 by driving of the motor 43M. Further, the opening and closing mechanism 40 includes, as the second opening and closing section 42 capable of opening and closing the atmosphere communication flow paths 25, a second pressing member 47 capable of pressing the atmosphere communication flow paths 25, and a second cam 45 configured to switch a pressing state of the second pressing member 47 by driving the motor 43M. The drive mechanism 43 may include a drive transmission section 43A for transmitting the drive force of the motor 43M. The drive transmission section 43A includes a rotation shaft, a gear, and the like. The drive transmission section 43A changes the speed of the drive force of the motor 43M and transmits it to the cams 44 and 45.

As shown in FIGS. 6 and 7, the opening and closing mechanism 40 includes the cams 44 and 45, the pressing members 46 and 47, and a flow path holding case 49 that holds the flow paths 24 and 25 in a sandwiched state. The flow path holding case 49 is an exterior case of the opening and closing mechanism 40. The flow path holding case 49 includes a flow path support section 49A and a flow path covering section 49B.

The flow path support section 49A is provided with a plurality of recesses 49E extending in a direction intersecting the axial direction of the cams 44 and 45. The supply flow paths 24 and the atmosphere communication flow paths 25 are inserted into the plurality of recesses 49E. The first pressing member 46 is disposed on the upper side of the four supply flow paths 24, and the second pressing member 47 is disposed above the one atmosphere communication flow path 25. Further, the first cam 44 is disposed above the first pressing member 46, and the second cam 45 is disposed above the second pressing member 47. The flow paths 24 and 25, the pressing members 46 and 47, and the cams 44 and 45 are arranged in this order from the flow path support section 49A side, in between the flow path support section 49A and the flow path covering section 49B.

The flow path covering section 49B has a plurality of engaging sections 49C. Further, the flow path support section 49A has a plurality of engaged sections 49D at positions corresponding to the plurality of engaging sections 49C. By locking the plurality of engaging sections 49C with the plurality of engaged sections 49D, the flow path support section 49A and the flow path covering section 49B are fixed together as the single flow path holding case 49. By this, the opening and closing mechanism 40 shown in FIG. 6 is constructed.

The first opening and closing section 41 includes the first cam 44 and the first pressing member 46. When the first cam 44 is positioned at the rotation angle of the closed position, the first opening and closing section 41 closes the supply flow paths 24 by the first cam 44 pushing the first pressing member 46. The second opening and closing section 42 includes the second cam 45 and the second pressing member 47. When the second cam 45 is positioned at the rotation angle of the closed position, the second opening and closing section 42 closes the atmosphere communication flow paths 25 by the second cam 45 pushing the second pressing member 47.

As shown in FIG. 7, the cams 44 and 45 are arranged coaxially, and one axial end portion thereof is coupled to the motor 43M via the drive transmission section 43A. The cams 44 and 45 are integrally formed of, for example, resin. Further, the pressing members 46 and 47 and the flow path holding case 49 are, for example, also molded products of resin. The atmosphere communication flow path 25 is divided into three parts including a first flow path section 25A coupled to the first liquid container 23A and a second flow path section 25B coupled to the second liquid container 23B. An opening end of the flow path section excluding the first flow path section 25A and the second flow path section 25B is an air opening port 25C.

Operation of the Opening and Closing Mechanism 40

Figure 8:
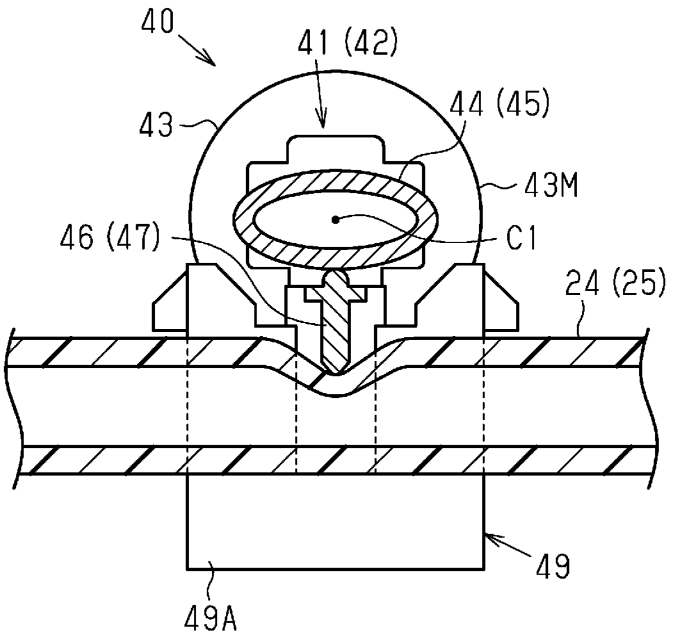
FIG. 8 is a cross-sectional view showing a state in which the opening and closing mechanism opens the flow path.
Figure 9:
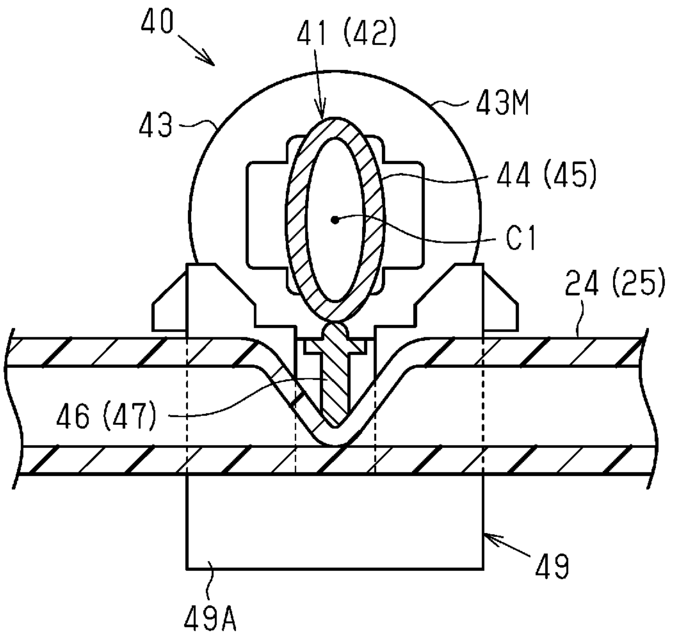
FIG. 9 is a cross-sectional view showing a state in which the opening and closing mechanism closes the flow path.

Next, the operation of the opening and closing mechanism 40 will be described with reference to FIGS. 8 and 9. FIG. 8 shows a state when the opening and closing mechanism 40 is in the open position. FIG. 9 shows a state in which the opening and closing mechanism 40 is in the closed position. FIGS. 8 and 9 are sectional views of the opening and closing mechanism 40 as viewed in the axial direction of the cams 44 and 45, and show an open and closed state of a portion of the supply flow paths 24. FIG. 8 shows an open state of the supply flow paths 24, and FIG. 9 shows a closed state of the supply flow paths 24. In FIGS. 8 and 9, the flow path covering section 49B of the flow path holding case 49 is not shown.

As shown in FIGS. 8 and 9, the cams 44 and 45 are formed in such a shape that the diameter lengths thereof with respect to the rotation center C1 vary depending on the position in the circumferential direction. A shape of an outer peripheral surface forming a cam surface of the cam 44 is, for example, an elliptical shape. The control section 90 rotationally drives the motor 43M to rotate the cams 44 and 45, for example, in the clockwise direction in FIGS. 8 and 9. As shown in FIGS. 8 and 9, when the cam 44 (45) rotates, the position where the outer peripheral surface of the cam 44 (45) abuts on the pressing member 46 (47) changes, and the pressing members 46 (47) are displaced in the direction in which they can approach and separate from the flow path 24 (25).

As shown in FIG. 8, when the cam 44 is in a posture in which the long diameter direction of the cam 44 and the supply flow paths 24 are substantially parallel to each other, the pressing member 46 (47) is displaced in a direction away from the flow path 24 (25). Therefore, the amount of displacement, in the direction in which the pressing member 46 (47) presses the supply flow paths 24, is reduced, and the flow path 24 (25) is opened.

As shown in FIG. 9, when the cam 44 enters a posture in which the long diameter direction of the cam 44 and the supply flow path 24 are substantially perpendicular to each other, the pressing member 46 (47) is displaced in a direction to approach the flow path 24 (25). Therefore, the amount of displacement increases in the direction in which the pressing member 46 (47) presses the supply flow path 24, and the flow paths 24 (25) are closed. In this manner, the opening and closing mechanism 40 opens and closes the four supply flow paths 24.

On the other hand, the outer peripheral surface shape of the second cam 45 may be different from the outer peripheral surface shape of the first cam 44. Since the cams 44 and 45, in the present embodiment, coaxially rotate about the rotation center C1, the second cam 45 may be formed to have a predetermined outer peripheral surface shape so that a desired combination of open and closed states (for example, the combination shown in FIG. 13) can be realized even when the cam coaxially rotates. For example, the cams 44 and 45 have a short diameter portion and a long diameter portion. The first cam 44 has an ellipsoidal outer peripheral surface shape in which a portion that abuts the first pressing member 46 changes in one rotation in the order of a short diameter portion at 0 degrees, a long diameter portion at 90 degrees, a short diameter portion at 180 degrees, and a long diameter portion at 270 degrees. On the other hand, the second cam 45 has an outer peripheral surface shape in which a portion that abuts on the second pressing member 47 changes in one rotation in the order of a short diameter portion at 0 degrees, a short diameter portion at 90 degrees, a long diameter portion at 180 degrees, and a long diameter portion at 270 degrees.

For example, when the liquid ejection apparatus 11 is transported, if the supply flow paths 24 are closed by the opening and closing mechanism 40, ink is less likely to leak from the nozzles 33 of the liquid ejection section 31. When the liquid ejection apparatus 11 is transported, vibration or impact acts on the liquid in the liquid containers 23 or the supply flow paths 24. As a result, pressure acts on the liquid in the nozzles 33 of the liquid ejection section 31, and there is a risk that the liquid such as ink leaks from the nozzles 33.

If the supply flow paths 24 is closed by the opening and closing mechanism 40 before the liquid ejection apparatus 11 is transported, it is possible to suppress leakage of liquid such as ink from the nozzles 33 even if there is a pressure fluctuation acting on the liquid in the liquid ejection section 31 when the liquid ejection apparatus 11 is transported.

In the present embodiment, a user, a transporter, or a repairman puts the liquid ejection apparatus 11 into a transport mode during power-on, and then powers off the liquid ejection apparatus 11. As a result, the motor 43M is driven before the power is turned off, so that the first opening and closing section 41 is displaced in the closed position and the supply flow paths 24 are closed. In this state, the liquid ejection apparatus 11 is transported. When the transportation of the liquid ejection apparatus 11 is complete, the user turns on the power of the liquid ejection apparatus 11. The control section 90 returns the liquid ejection apparatus 11 from the transport mode to the normal mode during a period from when the power is turned on to when the liquid consumption operation is performed for the first time. By returning to the normal mode, the supply flow paths 24 which were in the transport mode and in the closed state are opened. Accordingly, in the liquid ejection apparatus 11 set to the normal mode, both the supply flow paths 24 and the atmosphere communication flow paths 25 are in an open state. That is, the liquid in the liquid containers 23 can be supplied to the liquid ejection section 31.

Here, when the opening and closing mechanism is configured to be openable and closable by a manual operation, even though a user, a transporter, a repairman, or the like manually operates a manual operation section such as an operation lever from an open position to a closed position in order to transport the liquid ejection apparatus 11, an operation of manually changing the manual operation section from the open position to the closed position is possible during transport. For this reason, during transportation of the liquid ejection apparatus 11, a user, a transporter, a repairman, or the like may erroneously change the manual operation section from the closed position to the open position, or may forget to return the change to the original closed position when the manual operation section is intentionally changed from the closed position to the open position. In these cases, the subsequent transport is performed in a state in which the supply flow paths 24 are opened. As a result, there is a risk that the ink will leak from the nozzles 33 of the liquid ejection section 31 during transportation of the liquid ejection apparatus 11.

In addition, when the opening and closing mechanism is configured to be openable and closable by a manual operation, there is the risk that a user will forget an operation of returning the manual operation section from the closed position to the open position even through transportation of the liquid ejection apparatus 11 is complete. In this case, there is a risk that the printing process is performed in a state in which the supply flow paths 24 are closed, ink is not ejected from the nozzle 33 of the liquid ejection section 31, and an image is not printed on the medium M.

The liquid ejection apparatus 11 of the present embodiment includes a configuration that suppresses a problem of a user or the like forgetting to change the manual operation section from the closed position to the open position after the transport is complete, and a printing process being performed in a state in which the supply flow paths 24 is closed. The liquid ejection apparatus 11 of the present embodiment does not include a manual operation section that switches the opening and closing state of the opening and closing mechanism 40, but may include another manual operation section. In this case, under the power-off state, the manual operation section is locked to be inoperable by a lock mechanism (not shown), or the connection between the manual operation section and the opening and closing mechanism 40 is interrupted by a clutch (not shown) or the like, so that the opening and closing mechanism 40 is not switched even when the manual operation section is operated.

Internal Configuration of Liquid Containers 23 and Configuration of the Maintenance Unit 50

Next, internal configuration of the liquid containers 23 and configuration of the maintenance unit 50 will be described with reference to FIG. 10. As shown in FIG. 10, the liquid containers 23 include the accommodation chamber 26 capable of containing liquid, the injection section 27 through which liquid is injected, an atmosphere communication section 64 for bringing the accommodation chamber 26 into communication with atmosphere, and a liquid outlet 65 for leading out the liquid in the accommodation chamber 26 to supply the liquid to the liquid ejection section 31.

The liquid containers 23 and the liquid ejection section 31 communicate with each other through the supply flow paths 24. Liquid such as ink in the liquid containers 23 is supplied toward the liquid ejection section 31 via the supply flow paths 24 coupled to the liquid outlet 65.

When liquid such as ink in the liquid containers 23 is consumed and the liquid amount in the liquid containers 23 decreases, the pressure in the liquid containers 23 becomes lower than the atmospheric pressure. At this time, since the atmosphere communication flow paths 25 coupled to the atmosphere communication section 64 is in an open state, the atmosphere can flow into the accommodation chamber

26 from the atmosphere communication section 64. Therefore, the pressure in the liquid containers 23 is maintained at atmospheric pressure.

The liquid containers 23 include two injection flow paths 61 and 62 that bring the injection port 27A of the injection section 27 into communication with the accommodation chamber 26. The two injection flow paths 61 and 62 couple the injection port 27A, which opens to the outside of the accommodation chamber 26, and a delivery port 27B, which opens to the inside of the accommodation chamber 26. That is, the liquid containers 23 have the two injection flow paths 61 and 62, whose upper end openings are the injection port 27A and whose lower end openings are the delivery port 27B. By coupling the supply port of the liquid bottle 75 to the injection port 27A, the liquid can be injected from the liquid bottle 75 into the accommodation chamber 26 through the injection flow paths 61 and 62. The delivery port 27B is located at an upper limit position indicated by the upper limit mark UL (see FIG. 3).

The atmosphere communication section 64 communicates with the accommodation chamber 26 at a position above the highest liquid level, which is the height position of the delivery port 27B. Further, the accommodation chamber 26 and the atmosphere communication section 64 may communicate with each other through an atmosphere communication passage (not shown) formed in a narrow and serpentine shape.

As shown in FIG. 10, since there are two the injection flow paths 61 and 62, when the liquid is injected up to the delivery port 27B at the time of liquid injection, the liquid injection automatically stops. Therefore, the user or the like can inject the liquid without checking the upper limit mark UL. At this time, the atmosphere communication flow path 25 is closed by the opening and closing mechanism 40. Even when the atmosphere communication flow path 25 is closed, the liquid from the liquid bottle 75 is injected into the accommodation chamber 26 through one of the two injection flow paths 61 or 62. At the same time, the air in the accommodation chamber 26 is supplied to the liquid bottle 75 through the other of the two injection flow paths 61 or 62. As a result, the gas-liquid exchange is continuously performed between the liquid bottle 75 and the accommodation chamber 26 via two of the injection flow paths 61 and 62, so that the liquid from the liquid bottle 75 replenishes the accommodation chamber 26. When the liquid level L1 in the accommodation chamber 26 reaches the height indicated by two dot chain line in FIG. 10 due to the injection of the liquid, the two delivery ports 27B become blocked by liquid, so that gas-liquid exchange cannot be performed and injection of the liquid stops.

Here, when the atmosphere communication flow path 25 is open and the inside of the accommodation chamber 26 communicates with atmosphere, even when the liquid level L1 reaches the delivery port 27B at the time of liquid injection, gas-liquid exchange is continued through the atmosphere communication flow path 25, and thus the liquid injection does not stop. In order to avoid a situation in which the liquid injection does not stop, the control section 90 controls the opening and closing mechanism 40 to close at least the atmosphere communication flow path 25 when the control section 90 can predict that liquid injection will be performed.

By closing the atmosphere communication flow path 25, the delivery port 27B will be blocked by the liquid reaching the height of the delivery port 27B when the liquid level reaches the fill-up height at the time of liquid injection. As a result, since the gas-liquid exchange is stopped, the liquid injection from the liquid bottle 75 into the liquid container 23 automatically stops.

In addition, the bottom wall of the accommodation chamber 26 is formed to be inclined in the depth direction Y so that the front surface side is higher. The liquid containers 23 each include the accommodation chamber 26, a liquid outlet path 68 that communicates with the accommodation chamber 26 at the rear surface side, and the liquid outlet 65 that leads out the liquid that has passed via the liquid outlet path 68. When liquid is consumed in the liquid ejection head 32, the liquid stored in the accommodation chamber 26 is supplied to the liquid ejection section 31 via a filter and through the liquid outlet path 68, the liquid outlet 65, and the supply flow paths 24.

The supply flow paths 24 and the atmosphere communication flow paths 25 are configured to be openable and closable by the opening and closing mechanism 40 at respective intermediate positions. The supply flow paths 24 are opened and closed by the first opening and closing section 41. The atmosphere communication flow path 25 is opened and closed by the second opening and closing section 42. The first opening and closing section 41 and the second opening and closing section 42 are opened and closed by the drive of the motor 43M of the drive mechanism 43.

In addition, as shown in FIG. 10, the liquid ejection apparatus 11 includes a linear encoder 39 for detecting the position and the speed in the main scanning direction X of the reciprocating carriage 30. The linear encoder 39 includes a linear code plate 39B, which is provided on the housing 14A and is parallel to the main scanning direction X, and an optical sensor 39A, which is provided on the carriage 30. A predetermined electric signal corresponding to the moving state of the carriage 30 is output from the optical sensor 39A. An encoder signal including a digital pulse proportional to the amount of movement of the carriage 30 is output from the optical sensor 39A as an electrical signal. The encoder signal is input to the control section 90 (to be described later). The control section 90 performs position control and speed control of the carriage 30 based on the encoder signal. For example, the control section 90 performs position control to move the carriage 30 (liquid ejection section 31) and stop the carriage 30 at the standby position HP and the exchange position EP.

As shown in FIG. 10, the maintenance unit 50 includes the cap 51 on an upper portion of a main body 52 in a state in which the cap 51 can be raised and lowered. The cap 51 is biased upward by a spring 54. The cap 51 is configured to be movable up and down between a retracted position indicated by solid line in FIG. 10 and a raised position indicated by two dot chain line in FIG. 10. When the cap 51 abuts the nozzle surface 32A of the liquid ejection head 32, a closed space communicating with the nozzles 33 is formed. Therefore, during non-printing, thickening and drying of the liquid such as ink in the nozzle 33 are suppressed. The maintenance unit 50 includes the pump 53 on a side portion of the main body 52. When the pump 53 is driven by a motor (not shown) in a state in which the cap 51 abuts the nozzle surface 32A to form the closed space, a negative pressure is introduced into the closed space, so that the liquid is forcibly discharged from the nozzles 33 into the cap 51. The liquid (waste liquid) discharged into the cap 51 is collected in a waste liquid container (not shown) through a waste liquid tube (not shown) coupled to the cap 51.

The liquid ejection head 32 includes a pressure generation chamber (not shown) that communicates with the nozzles

33, and a piezoelectric element (not shown) that changes the volume of the pressure generation chamber by, for example, an electrostrictive effect. The nozzles 33, which open on the nozzle surface 32A, communicate with the supply flow paths 24 via a flow path (not shown) in the liquid ejection section 31. The piezoelectric element vibrates a vibration plate (not illustrated), which forms a part of the pressure generating chamber, to generate pressure fluctuation in the pressure generating chamber, and liquid such as ink is ejected from the nozzles 33 by using the pressure fluctuation. A liquid ejection method (for example, an inkjet method) of the liquid ejection head 32 is not limited to a piezoelectric method (piezo method), and may be, for example, a thermal method or a bubble method.

Electrical Configuration of Liquid Ejection Apparatus 11

Next, with reference to FIG. 12, an electric configuration of the liquid ejection apparatus 11 will be described.

As shown in FIG. 12, the control section 90 includes a central processing unit (CPU) 91 provided on a control board, a storage section 92, and an interface unit (I/F) 93.

The I/F 93 performs data transmission and reception between an external host device 100 and the liquid ejection apparatus 11. The host device 100 and the liquid ejection apparatus 11 may be directly coupled by a cable or the like, or may be indirectly coupled via a network or the like. In addition, data may be transmitted and received between the host device 100 and the liquid ejection apparatus 11 via wireless communication. The host device 100 is a terminal capable of giving an instruction for printing or scanning to the liquid ejection apparatus 11. The host device 100 is a personal computer (PC), a tablet, a smartphone, a cellular phone, or the like.

The CPU 91 is an arithmetic processing device that executes overall control of the liquid ejection apparatus 11.

The storage section 92 is a storage medium that secures an area for storing a program in which the CPU 91 operates, an operation area in which the program operates, and the like, and is composed of a storage element such as a RAM or an EPROM.

The control section 90 creates print data based on image data received from the host device 100, and controls the liquid ejection section 31, the carriage motor 36, the transport mechanism 70, and the like based on the print data.

The host device 100 may create print data, and the control section 90 may control the liquid ejection section 31, the carriage motor 36, the transport mechanism 70, and the like based on the print data received from the host device 100. Furthermore, a configuration may be adopted in which the control section 90 creates print data based on an operation command input by a user using the operation section 15 of the operation panel 17, and controls the liquid ejection section 31, the carriage motor 36, the transport mechanism 70, and the like based on the print data.

Further, the control section 90 drives a piezoelectric element provided in the liquid ejection section 31 to eject a liquid such as ink from the plurality of nozzles 33 toward the medium M. Further, the control section 90 supplies a drive signal to drive the carriage motor 36.

Here, a printing operation in which the liquid ejection apparatus 11 prints on the medium M will be described.

The medium M accommodated in the medium accommodation section 18 is transported by the transport mechanism 70 from the upstream side to the downstream side in the transport direction −Y, which intersects with the main scanning direction X. The transport mechanism 70 transports the medium M in a state in which the transport mechanism 70 is supported by a support base (platen) (not illustrated) that is provided in a region facing the liquid ejection section 31 below the liquid ejection section 31. Then, the liquid ejection section 31 ejects a liquid such as ink from the nozzles 33 onto the surface of the medium M supported by the support base which faces the liquid ejection section 31. The liquid ejection section 31 reciprocates in the main scanning direction X while being mounted on the carriage 30. Characters, images, or the like are printed on the medium M by alternately performing a printing operation of ejecting liquid from the nozzles 33 in a process in which the liquid ejection section 31 moves in the main scanning direction X and a transport operation of transporting the medium M to a next printing position. The medium M on which printing has been performed is discharged toward a medium discharge tray (not illustrated).

The control section 90 receives an electric signal output from the linear encoder 39 (the optical sensor 39A) for detecting the position and speed of the carriage 30, which moves in accordance with drive of the carriage motor 36.

The control section 90 drives the transport mechanism 70 to move the medium M in a transport direction −Y, which intersects with the main scanning direction X.

The control section 90 performs a maintenance operation on the liquid ejection section 31 by controlling the maintenance unit 50.

The control section 90 receives a command from the operation section 15 operated by a user, and performs various controls.

The control section 90 uses an opening and closing detection section 72, including an optical sensor or the like, to detect the open and closed states of the flow paths 24 and 25, which are opened and closed by the opening and closing mechanism 40. The opening and closing detection section 72 may be, for example, a rotary encoder or the like. The opening and closing detection section 72, which is composed by a rotary encoder, detects the open and closed state of the opening and closing mechanism 40 by detecting the rotation angle of the cams 44 and 45. The opening and closing detection section 72 of the present embodiment detects four switching positions as the open and closed states of the opening and closing mechanism 40.

The control section 90 calculates the position and the moving speed of the carriage 30 in the main scanning direction X using the electric signal output from the linear encoder 39 (the optical sensor 39A). That is, the control section 90 controls the movement of the carriage 30.

The control section 90 moves the carriage 30 in the −X direction so that the carriage 30 is brought to abut with the sidewall of the housing 14A. When the carriage 30 abuts the side wall of the housing 14A, the movement of the carriage 30 in the −X direction is impeded, and the carriage 30 stops. When the movement of the carriage 30 in the −X direction is impeded, the driving load of the carriage motor 36 increases. The control section 90 defines the position of the carriage 30 when an increase in the drive load of the carriage motor 36 is detected as a reference position, and defines a standby position HP and an exchange position EP in the main scanning direction X.

The operation section 15 and the display section 16 are electrically coupled to the control section 90. The liquid ejection apparatus 11 may include a capacity detecting section (not shown) for detecting the capacity of the liquid contained in each liquid container 23. The capacity detecting section is, for example, a level sensor for detecting the capacity of the liquid contained in each liquid container 23, and outputs a detection signal indicating the detection result to the control section 90.

The CPU 91 manages various controls including control of the liquid ejection apparatus 11 by executing a control program stored in the storage section 92. The storage section 92 stores a control program that governs various controls in the liquid ejection apparatus 11 and reference data that is referred to in the control program. Various kinds of information for controlling the liquid ejection apparatus 11 by the control section 90 are stored in the storage section 92. The storage section 92 according to the present embodiment stores various programs illustrated in flowcharts of FIGS. 14, 15, and 16 as examples of control programs. Specifically, a program (FIG. 14) that includes control of the opening and closing mechanism 40 during the transport mode, a program (FIG. 15) that includes control of replacement of the liquid ejection section 31, and a program (FIG. 16) that includes control of the opening and closing mechanism 40 during liquid injection are stored in the storage section 92.

Figure 15:
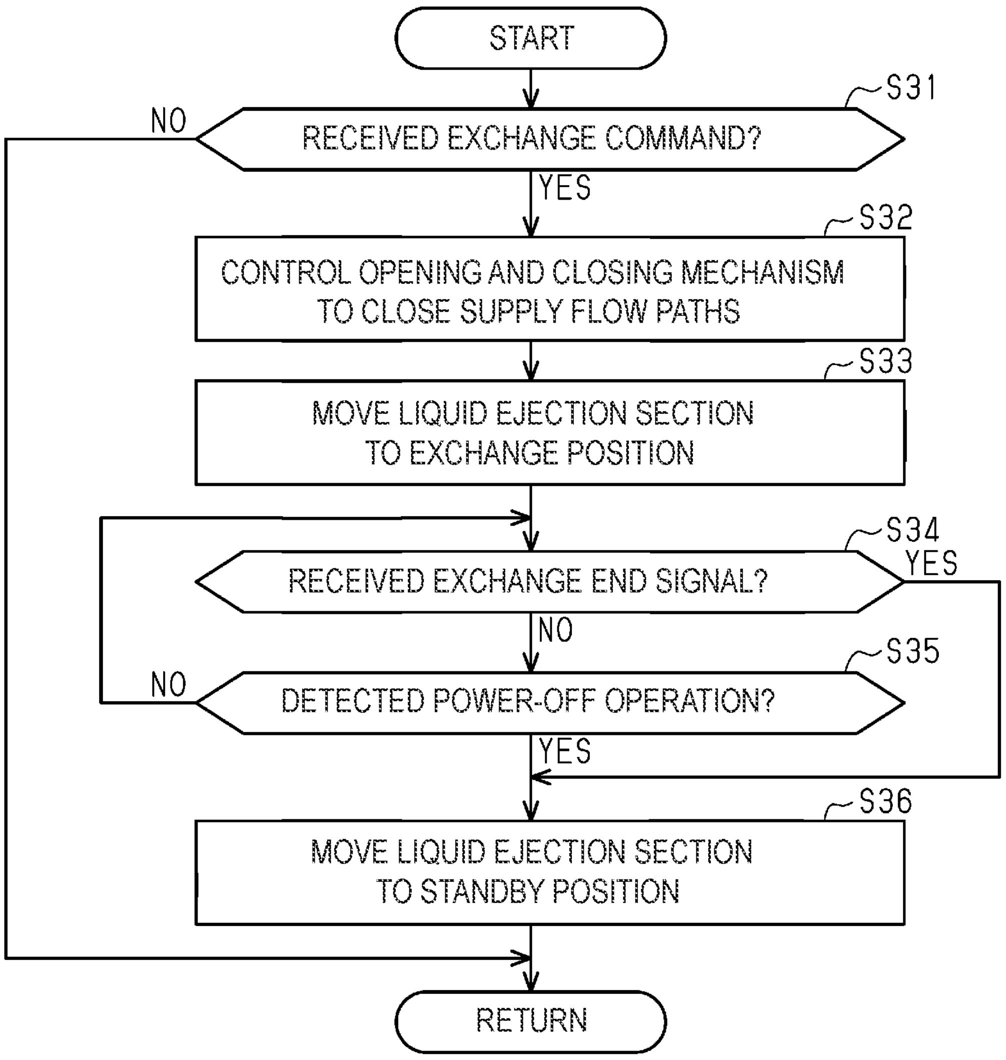
FIG. 15 is a flowchart showing control contents when the replacement of the liquid ejection section is performed.
Figure 16:
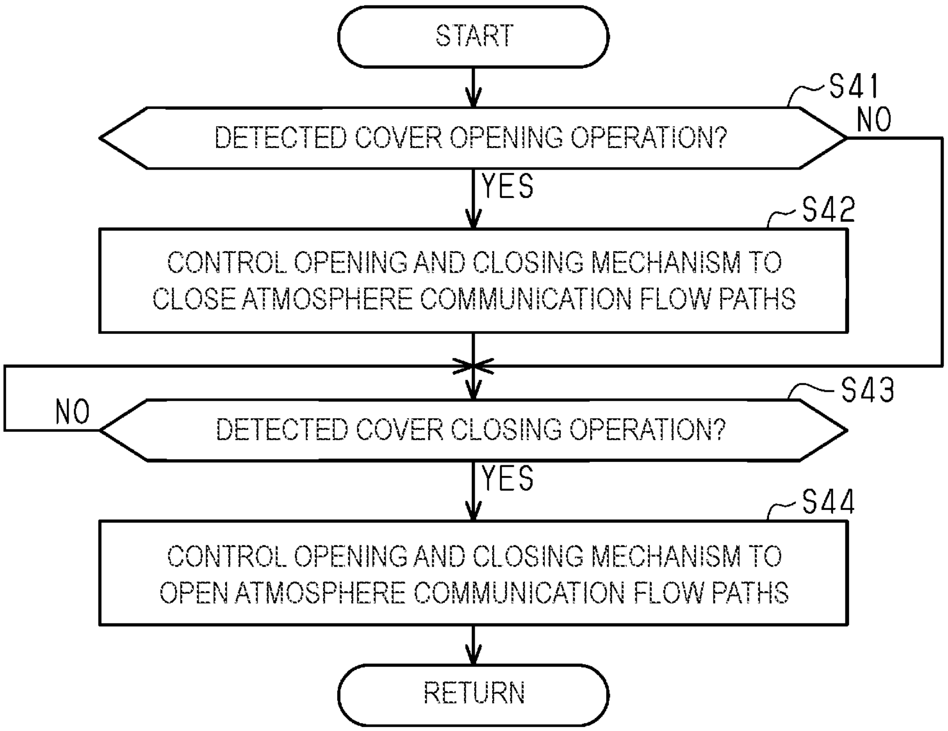
FIG. 16 is a flowchart showing control contents when the cover is opened and closed.

The control section 90 (the CPU 91) executes a program to execute control of the opening and closing mechanism 40 during the transportation mode (FIG. 14), exchange control of the liquid ejection section 31 (FIG. 15), and control of the opening and closing mechanism 40 during liquid injection (FIG. 16).

The control section 90 manages the mode of the liquid ejection apparatus 11. When there is a command to transport the liquid ejection apparatus 11, the second mode (transport mode) is selected, and when there is no command to transport the liquid ejection apparatus 11, the first mode (normal mode) is selected. In this embodiment, the first mode is a normal mode when transportation of the liquid ejection apparatus 11 is not performed, and the second mode is a transportation mode when transportation of the liquid ejection apparatus 11 is performed.

When the second mode (transport mode) is selected, at least one of the supply flow path 24 and the atmosphere communication flow path 25 are closed by the opening and closing mechanism 40. When transportation of the liquid ejection apparatus 11 is complete and power is turned on the next time, the opening and closing mechanism 40 switches from the closed state to the open state during a period from the timing when power is next turned on to the timing of the start of the consumption of the liquid by the liquid ejection section 31. The control section 90 detects that power was turned on when a user or the like operates the power operation section 15A. Upon detection of power being turned on, the control section 90 checks the current mode, and if the second mode is selected, the control section 90 controls the opening and closing mechanism 40 to switch from the closed state to the open state until the first liquid consumption is started after power is turned on.

For example, if the control section 90 is in the second mode at the time of power-on detection, the control section 90 may switch to the first mode at that time. Alternatively, when a liquid consumption operation is commanded after power-on detection, the control section 90 may switch from the second mode to the first mode before starting the liquid consumption operation. Here, the liquid consumption operation is a printing operation or a maintenance operation. The maintenance operation includes a cleaning operation and a flushing operation (dummy eject operation). Further, the liquid consumption operation includes a nozzle inspection performed by ejecting liquid from the nozzles 33. For example, an inspection operation of ejecting liquid from the nozzles 33 in order to execute a nozzle check inspection for detecting nozzle clogging is also included. For example, when a first maintenance command is received after power-on is detected, the control section 90 switches from the second mode to the first mode before starting the maintenance operation. As a result, the control section 90 controls the opening and closing mechanism 40 to open the supply flow paths 24.

Accordingly, when a liquid consumption operation such as a liquid ejecting operation or a liquid discharging operation is performed, liquid is supplied from the liquid containers 23 to the liquid ejection section 31 through the supply flow paths 24. As a result, a required amount of liquid is ejected from the nozzles 33 of the liquid ejection section 31. If the supply flowpath 24 is closed when liquid is consumed, there is a risk that an ejection failure or a discharge failure may occur in which a necessary amount of liquid is not ejected or discharged, but there is no such concern.

Setting Screen

Figure 11:
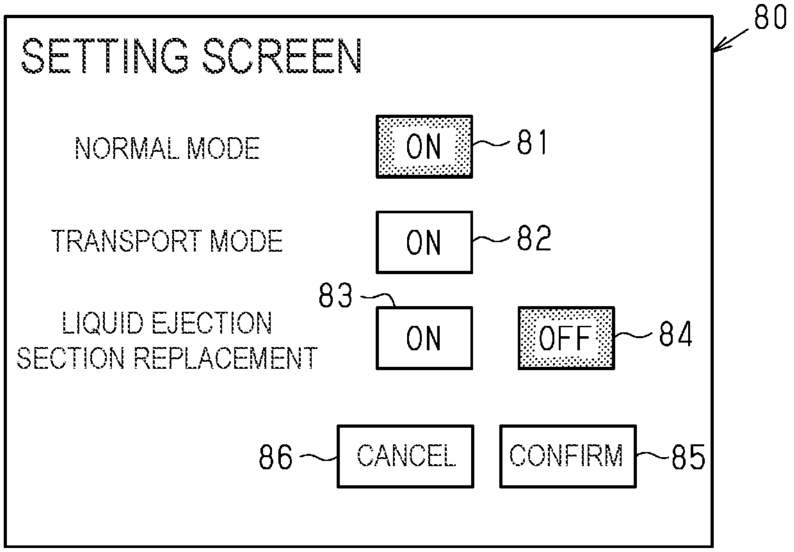
FIG. 11 is a diagram showing a setting screen.

Next, a setting screen 80 will be described with reference to FIG. 11. FIG. 11 is the setting screen 80 displayed on the display section 16. The user performs various settings on the liquid ejection apparatus 11 using the setting screen 80 by operating the operation section 15. The setting screen 80 may be displayed on a display section (not shown) of the host device 100, or various settings using the setting screen 80 may be performed on the liquid ejection apparatus 11 by operating an operation section (not shown) of the host device 100.

The liquid ejection apparatus 11 is configured to enable selection of a first mode in which, when power is turned off, power is turned off with the opening and closing mechanism 40 in the open state and a second mode in which, when power is turned off, power is turned off with the opening and closing mechanism 40 in the closed state.

The setting screen 80 shown in FIG. 11 is an operation screen for selecting and setting one of the first mode or the second mode. Here, in the present embodiment, the first mode is the normal mode, and the second mode is the transport mode. The transport mode is a mode selected when the liquid ejection apparatus 11 is transported. A user, a transporter, a repairman, or the like selects the transport mode on the setting screen 80 when the liquid ejection apparatus 11 is to be transported. There is a possibility that liquid can leak from the nozzles 33 by the liquid ejection apparatus 11 being disposed during transportation at an inclination that exceeds a normal allowable inclination range or by, even if the inclination is within the allowable range, liquid moving to the liquid ejection section 31 side due to pressure fluctuation or the like acting on the liquid in the supply flow paths 24 due to shaking during transportation. The transport mode is a mode for suppressing leakage of the liquid from the nozzles 33 during this type of transport. Therefore, the second mode in which the supply flow paths 24 are closed is applied in the transport mode. The first mode in which the supply flow paths 24 are opened is applied in the normal mode other than the transport mode.

As shown in FIG. 11, the setting screen 80 is provided with a first selection section 81 for selecting the normal mode and a second selection section 82 for selecting the transport mode. Each selection section 81, 82 is, for example, a selection button displayed on the screen, and is operated by the operation section 15, a keyboard, a pointing device, or the like.

As shown in FIG. 11, when the transport mode is selected by operating the second selection section 82, for example, the second selection section 82 displays an active selection state, and in conjunction with this, the first selection section 81 of the normal mode is displayed in, for example, a darkened non-selection state. On the other hand, when the first selection section 81 is operated to select the normal mode, the first selection section 81 displays, for example, an active selection state, and in association with this, the second selection section 82 of the transport mode is displayed in, for example, a darkened non-selection state. Instead of the configuration in which the selection is switched between the two selection sections 81 and 82, a configuration in which the first mode (normal mode) and the second mode (transport mode) are selected by switching one selection section between the selected state and the unselected state may be employed.

In addition, the setting screen 80 of the present embodiment is provided with a third selection section 83 that is selectively operated by a user or the like instructing that a liquid ejection section is to be replaced, and a fourth selection section 84 that is selectively operated by a user or the like when not instructing that a liquid ejection section be replaced. When the third selection section 83 is selected, the liquid ejection section exchange mode is set. When the liquid ejection section exchange mode is set, the "ON" indication of the third selection section 83 becomes active. When the fourth selection section 84 is selected, the setting of the liquid ejection section exchange mode is canceled. When the liquid ejection section exchange mode is canceled, the "OFF" indication of the fourth selection section 84 becomes active. Instead of the configuration in which the selection is switched between the two selection sections 83 and 84, a configuration in which one selection unit is switched between a selected state and a non-selected state may be employed.

Further, the setting screen 80 is provided with a confirmation button 85 to be operated when confirming contents selected by the operation of each of the selection sections 81 to 84 are confirmed, and a cancel button 86 to be operated when the selected setting contents are to be canceled. When the confirmation button 85 is operated, the control section 90 confirms the setting contents selected on the setting screen 80 at that time.

Opening and Closing Switching Control of the Opening and Closing Mechanism 40

Next, with reference to FIG. 13, a description will be given of an opening and closing switching control content of the opening and closing mechanism 40. The control section 90 controls the open and closed state of the opening and closing mechanism 40 by controlling the motor 43M constituting the drive mechanism 43 of the opening and closing mechanism 40.

As shown in FIG. 13, there are four opening and closing states of the opening and closing mechanism 40, which are combinations of opening and closing of the first opening and closing section 41 and opening and closing of the second opening and closing section 42. The control section 90 performs switching control to select one of the four switching positions by switching the rotational position of the cams 44 and 45 by the motor 43M based on the detection signal of the opening and closing detection section 72. That is, the control section 90 switches the cams 44 and 45 to the one of the four switching positions that corresponds to a command or the like at that time. In the present embodiment, each time their phase is switched by 90°, the cams 44 and 45, which have a predetermined outer peripheral surface shape such as an elliptical shape, switch the combination of the open and closed states of the first opening and closing section 41 and the second opening and closing section 42 as illustrated in FIG. 13.

As shown in FIG. 13, when the opening and closing mechanism 40 is at the first switching position, the first opening and closing section 41 opens and the second opening and closing section 42 opens. As a result, both the supply flow paths 24 and the atmosphere communication flow paths 25 are open. When the opening and closing mechanism 40 is at the second switching position, the first opening and closing section 41 close and the second opening and closing section 42 opens. As a result, the supply flow paths 24 are closed and the atmosphere communication flow paths 25 are open. When the opening and closing mechanism 40 is at the third switching position, the first opening and closing section 41 opens and the second opening and closing section 42 closes. As a result, the supply flow paths 24 are opened and the atmosphere communication flow paths 25 are closed. When the opening and closing mechanism 40 is in the fourth switching position, the first opening and closing section 41 is closed and the second opening and closing section 42 is closed. As a result, both the supply flow paths 24 and the atmosphere communication flow paths 25 are closed.

The control section 90 selects the second mode in a case where there is a command to transport the liquid ejection apparatus 11. In the second mode, when the power is turned off, the control section 90 turns off the power while the first opening and closing section 41 of the opening and closing mechanism 40 maintains the closed state.

The control section 90 selects the first mode in a case where there is no command to transport the liquid ejection apparatus 11. In the first mode, when the power is turned off, the control section 90 turns off the power while the first opening and closing section 41 of the opening and closing mechanism 40 maintains the open state.

When there is a command to exchange the liquid ejection section 31, the opening and closing mechanism 40 closes the supply flow paths 24. In the present embodiment, when there is a command to exchange the liquid ejection section 31, the control section 90 closes the supply flow paths 24 by closing the first opening and closing section 41 of the opening and closing mechanism 40. In this case, when there is a command to exchange the liquid ejection section 31, the control section 90 controls the opening and closing mechanism 40 to close at least the supply flow paths 24. That is, when there is a command to exchange the liquid ejection section 31, only the supply flow paths 24 may be closed, or both the supply flow paths 24 and the atmosphere communication flow paths 25 may be closed. In the present embodiment, when there is a command to exchange the liquid ejection section 31, the control section 90 controls the motor 43M to switch the opening and closing mechanism 40 to the second switching position or the fourth switching position. At least as long as the supply flow paths 24 are closed, even if one end of the supply flow paths 24 is removed from the liquid ejection section 31 when the liquid ejection section 31 is exchanged, leakage of liquid from the one end of the supply flow paths 24 is suppressed.

Alternatively, in a case where there is a command to exchange the liquid ejection section 31, the control section 90 may control the opening and closing mechanism 40 to close at least the atmosphere communication flow paths 25. That is, in a case where there is a command to exchange the liquid ejection section 31, only the atmosphere communication flow paths 25 may be closed, or both the supply flow paths 24 and the atmosphere communication flow paths 25 may be closed. In the present embodiment, the control section 90 may switch the opening and closing mechanism 40 to the third switching position or the fourth switching position. When at least the atmosphere communication flow paths 25 are closed, even if one end of the supply flow paths 24 is detached from the liquid ejection section 31 when the liquid ejection section 31 is exchanged, the air chamber above the liquid surface in the accommodation chamber 26 is in a sealed state, and thus leakage of the liquid from the one end of the supply flow paths 24 is suppressed.

When there is a command to exchange the liquid ejection section 31, the control section 90 controls the carriage 30 to move the liquid ejection section 31 to the exchange position EP where the liquid ejection section 31 can be exchanged. When there is a command to turn off the power while the carriage 30 is at the exchange position EP, the control section 90 controls the carriage 30 to move the liquid ejection section 31 to the standby position HP.

The control section 90 controls the opening and closing mechanism 40 to close at least the atmosphere communication flow paths 25 in accordance with the displacement of the cover 22 from the cover position to the exposed position recognized by the detection signal of the cover sensor 71. That is, in accordance with the displacement of the cover 22 from the cover position to the exposed position, the opening and closing mechanism 40 may close only the atmosphere communication flow paths 25 or may close both the atmosphere communication flow paths 25 and the supply flow paths 24. In the present embodiment, when the control section 90 detects that the cover 22 is displaced from the cover position to the exposed position based on the detection signal from the cover sensor 71, the control section 90 controls the motor 43M to switch the opening and closing mechanism 40 to the third switching position or the fourth switching position.

The control section 90 manages various modes by flags stored in a predetermined storage area of the storage section 92. The control section 90 has a flag for each type of mode, and manages the mode depending on whether the flag is "0" or "1". The control section 90 manages whether the mode is the normal mode or the transport mode depending on whether the first flag is "0" or "1". The control section 90 performs management based on whether the liquid ejection section exchange mode is on or off and whether the second flag is "0" or "1". The control section 90 performs management based on whether the liquid injection mode is on or off and whether the third flag is "0" or "1".

Action of Embodiment

Next, the operation of the liquid ejection apparatus 11 according to the present embodiment will be described.

During Normal Operation and During Transportation

When transporting the liquid ejection apparatus 11, the user selects the second mode, which is the transport mode. Upon receiving the transportation command, the mode of the liquid ejection apparatus 11 shifts from the first mode, which is the normal mode, to the second mode, which is the transportation mode.

Normally, the liquid ejection apparatus 11 is in the first mode, which is the normal mode. When transporting the liquid ejection apparatus 11, a user, a transporter, a repairman, or the like causes the display section 16 to display the setting screen 80 illustrated in FIG. 11. The setting screen 80 may be displayed on a display section of the host device 100 capable of communicating with the liquid ejection apparatus 11. The user or the like operates the operation section 15 on the setting screen 80 to select the transport mode and then operates the confirmation button 85. Then, the control section 90 accepts the transportation command. Upon receiving the transportation command, the control section 90 sets the second mode, which is the transportation mode. As a result, the liquid ejection apparatus 11 enters the second mode.

Figure 14:
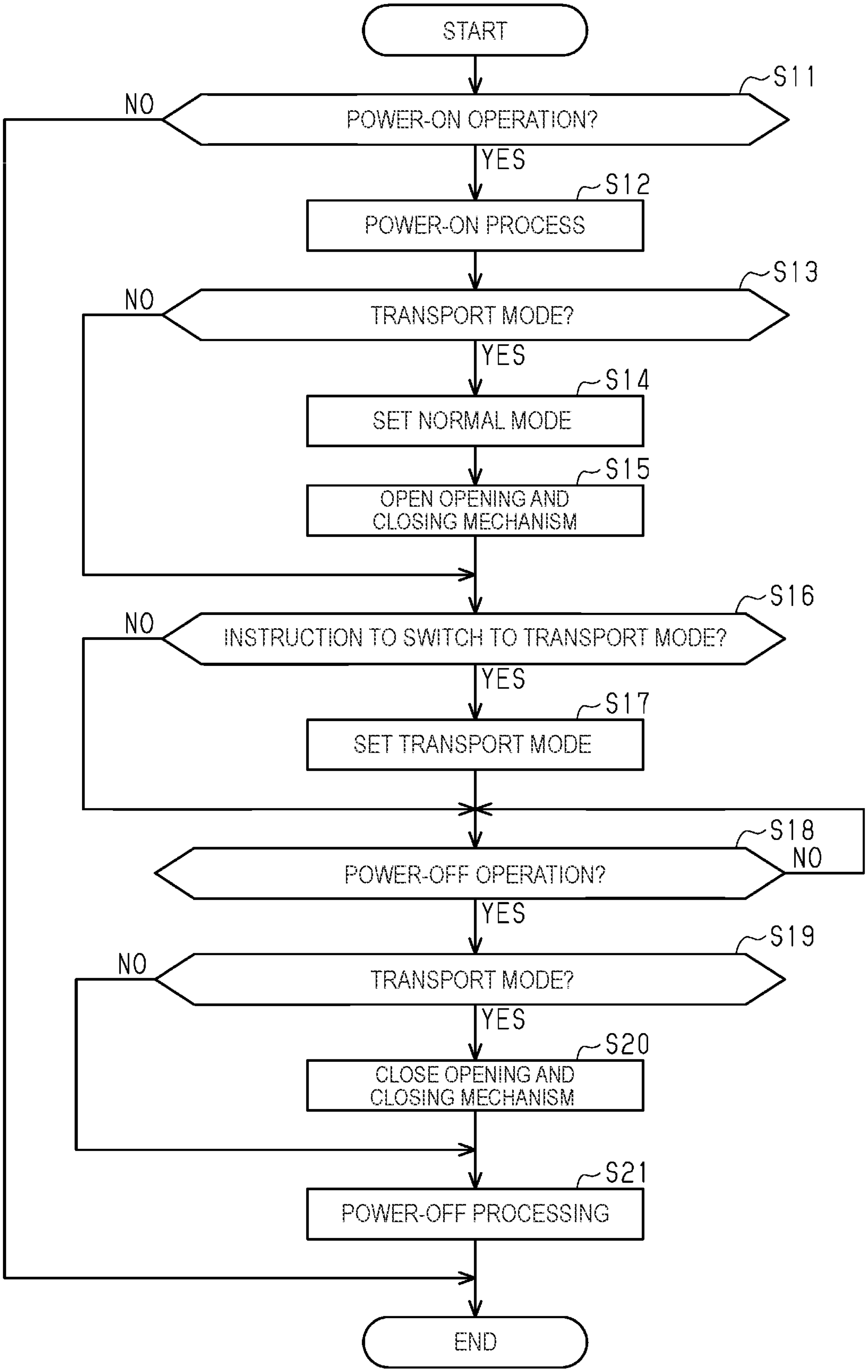
FIG. 14 is a flowchart showing control contents when the transport mode is turned on and off.

Thereafter, when printing is finished in the normal mode, for example, the user operates the power operation section 15A to turn off the power of the liquid ejection apparatus 11. In order to transport the liquid ejection apparatus 11, the user or the like who has set the transportation mode operates the power operation section 15A to turn off the power of the liquid ejection apparatus 11. The control section 90 executes a main routine shown in FIG. 14 at the timing when the power is turned on and off. With reference to FIG. 14, the control contents in mainly the transport mode will be described below.

First, in step S11, the control section 90 determines whether a power-on operation is detected. When a power-on operation is detected, the control section 90 proceeds to step S12, and when a power-on operation is not detected, the control section 90 ends this routine.

In step S12, the control section 90 performs a power-on process. The power-on process is a process performed when the power is turned on, and includes, for example, an initialization process.

In step S13, the control section 90 determines whether or not the mode is the transport mode. If it is the transport mode, the process proceeds to step S14, and if it is not the transport mode, the process proceeds to step S16. For example, when the transport mode is set during the power-on this time, the mode is the normal mode at the power-on time. Therefore, when the transport mode is to be set before the liquid ejection apparatus 11 is transported, the processes of steps S14 and S15 are not executed.

Next, a user or the like, who is going to transport the liquid ejection apparatus 11, selects the second selection section 82 on the setting screen 80 and then operates the confirmation button 85. The control section 90 receives the confirmation operation in a state where the second selection section 82 is selected as a command for switching to the transport mode. After setting the transport mode, the user performs printing or the like if necessary and then subsequently, in order to transport the liquid ejection apparatus 11, turns off the power by operating the power operation section 15A.

In step S16, the control section 90 determines whether or not a command to switch to the transport mode has been received. The control section 90 proceeds to step S17 when a command to switch to the transport mode is received, and proceeds to step S18 when no command to switch to the transport mode is received. Upon receiving a command to switch to the transport mode, the control section 90 proceeds to step S17.

In step S17, the control section 90 sets the transport mode. For example, the control section 90 sets the first flag of the storage section 92 to "1".

In step S18, the control section 90 determines whether a power-off operation is detected. When a power-off operation is detected, the process proceeds to step S19, and when a power-off operation is not detected, the process stands by until a power-off operation is detected. Note that the control section 90 executes necessary processes during this standby period, and executes the determination process of step S18 regularly or irregularly, for example, by interrupt processing.

In step S19, the control section 90 determines whether or not the mode is the transport mode. The control section 90 proceeds to step S20 if it is in the transport mode, and proceeds to step S21 if it is not in the transport mode. In this case, since the user or the like set the transport mode, the control section 90 proceeds to step S20.

In step S20, the control section 90 closes the opening and closing mechanism 40. Specifically, the control section 90 drives and controls the motor 43M to switch the opening and closing mechanism 40 to the second switching position or the fourth switching position. As a result, at least the supply flow paths 24 are closed in the transport mode. For example, when the opening and closing mechanism 40 is switched to the second switching position, the first opening and closing section 41 closes and the second opening and closing section 42 opens, so that the supply flow paths 24 are closed and the atmosphere communication flow paths 25 are opened. Further, for example, when the opening and closing mechanism 40 is switched to the fourth switching position, the first opening and closing section 41 closes, and the second opening and closing section 42 closes, so that both the supply flow paths 24 and the atmosphere communication flow paths 25 are closed.

In step S21, the control section 90 performs a power-off process. As the power-off process, the control section 90 performs, for example, a termination process of bringing the liquid ejection apparatus 11 into an appropriate termination state. Thereafter, a user, a transporter, a repairman, or the like transports the liquid ejection apparatus 11 in the power-off state. In the power-off state, in which the liquid ejection apparatus 11 is in the transport mode, the opening and closing mechanism 40 cannot be switched. For this reason, it is possible to suppress leakage of liquid from the nozzles 33, which might occur if the opening and closing state of the opening and closing mechanism 40 were switched during transport of the liquid ejection apparatus 11 and the liquid ejection apparatus 11, for example, were transported in a state in which the supply flow paths 24 were open.

After transportation of the liquid ejection apparatus 11 is finished in this manner, the user or the like operates the power operation section 15A to turn on the power of the liquid ejection apparatus 11. The liquid ejection apparatus 11 at the time of power-on is in the state of the transport mode set during the previous power-on.

In step S11, the control section 90 determines whether a power-on operation is detected. When the control section 90 detects a power-on operation, the process proceeds to step S12.

In step S12, the control section 90 performs a power-on process. The control section 90 executes, for example, an initialization process as the power-on process.

In step S13, the control section 90 determines whether or not the mode is the transport mode. Since the control section 90 determines that the mode is the transport mode, the process proceeds to step S14.

In step S14, the control section 90 sets the normal mode. That is, the control section 90 switches from the transport mode to the normal mode.

In the next step S15, the control section 90 opens the opening and closing mechanism 40. Specifically, the control section 90 controls the motor 43M to switch the opening and closing mechanism 40 to the first switching position. As a result, the first opening and closing section 41 of the opening and closing mechanism 40 opens the supply flow paths 24, and the second opening and closing section 42 opens the atmosphere communication flow paths 25.

The above is the processing executed by the control section 90 from the timing at which the liquid ejection apparatus 11 is powered on to the timing at which the first consumption of liquid is started. That is, in a case where the transport mode (second mode) had been selected when power is turned on, the opening and closing mechanism 40 is switched from the closed state to the open state during a period from the timing when the power is turned on to the timing when the first consumption of the liquid by the liquid ejection section 31 is started. Specifically, the control section 90 controls the opening and closing mechanism 40 to open both the supply flow paths 24 and the atmosphere communication flow paths 25 during a period from a timing at which the power is turned on to a timing at which consumption of the liquid by one of printing, cleaning, and flushing is started. The timing of opening the opening and closing mechanism 40 may be, for example, at the time that power is turned on or immediately before the liquid consumption operation is performed for the first time after the power was turned on.

Exchange of Liquid Ejection Section

The user, the repairman, or the like displays the setting screen 80 on the display section 16 and operates the operation section 15 to select the liquid ejection section exchange mode, thereby giving a liquid ejection section exchange command to the control section 90. The setting screen 80 may be displayed on a display section of the host device 100, and a liquid ejection section exchange command may be issued to the control section 90 by operating an operation section such as a keyboard of the host device 100 to select a liquid ejection section exchange mode. A user, a repairman, or the like selects the third selection section 83 on the setting screen 80 to select the liquid ejection section exchange mode. After the liquid ejection section exchange mode is selected, the user or the repairman operates the confirmation button 85. The control section 90 receives this confirmation operation as an exchange command.

Hereinafter, a liquid ejection section exchange control routine executed by the control section 90 will be described with reference to FIG. 15.

In step S31, the control section 90 determines whether an exchange command has been received. When a exchange command is received, this routine proceeds to step S32, and when a exchange command is not received, the routine ends.

In step S32, the control section 90 controls the opening and closing mechanism 40 to close the supply flow paths 24.

In step S33, the control section 90 moves the liquid ejection section 31 to the exchange position EP.

In step S34, the control section 90 determines whether an exchange end signal has been received. If an exchange end signal was not received, the process proceeds to step S35, and if an exchange end signal was received, the process proceeds to step S36.

In step S35, the control section 90 determines whether a power-off operation is detected. If a power-off operation is detected, the process proceeds to step S36, and if a power-off operation is not detected, the process returns to step S34.

In step S36, the control section 90 moves the liquid ejection section 31 to the standby position HP. Therefore, the control section 90 moves the carriage 30 to the standby position HP when the control section 90 receives the exchange end signal output when the user operates the operation section 15 at the end of exchange, or when the control section 90 detects a power-off operation without receiving the exchange end signal. Therefore, when the user or the repairman turns off the power during the exchange of the liquid ejection section, the carriage 30 moves from the exchange position EP to the standby position HP, so that the nozzle surface 32A of the liquid ejection head 32 of the liquid ejection section 31 is capped with the cap 51. As a result, a substantially closed space surrounded by the nozzle surface 32A of the liquid ejection head 32 and the cap 51 is formed. As a result, drying of the liquid such as ink in the nozzle 33 is suppressed.

During Liquid Injection

At the time of liquid injection, the user opens the cover 13A (scanner 13) that covers the opening of the housing 14A, and then further opens the cover 22 of the liquid storage units 20.

The control section 90 executes a cover opening operation interlocking control routine shown in FIG. 16 while the power of the liquid ejection apparatus 11 is turned on.

In step S41, the control section 90 determines whether a cover opening operation is detected. When a cover opening operation for opening the cover 22 from the cover position to the exposed position is performed, the cover sensor 71 is switched from ON to OFF. When the cover sensor 71 is switched from ON to OFF, the control section 90 detects this as an opening operation of the cover 22. The control section 90 proceeds to step S42 when the cover opening operation is detected, and proceeds to step S43 when the cover opening operation is not detected.

In step S42, the control section 90 controls the opening and closing mechanism 40 to close the atmosphere communication flow paths 25. Specifically, the control section 90 closes at least the atmosphere communication flow paths 25 by switching the opening and closing mechanism 40 to the third switching position or the fourth switching position. For example, when the opening and closing mechanism 40 is switched to the third switching position, only the atmosphere communication flow paths 25 are closed. For example, when the opening and closing mechanism 40 is switched to the fourth switching position, both the supply flow paths 24 and the atmosphere communication flow paths 25 are closed.

In this state, after opening the cover 22, the user then opens the lid member 28 of the liquid container 23 to be replenished with liquid such as ink and exposes the injection port 27A. By turning the liquid bottle 75 upside down and coupling the supply portion thereof to the injection port 27A, a liquid such as ink is injected from the liquid bottle 75 into the accommodation chamber 26 via the injection port 27A. At this time, before the liquid level L1 of the liquid injected into the accommodation chamber 26 reaches the full level, gas-liquid exchange is performed between the liquid bottle 75 and the accommodation chamber 26 through the two injection flow paths 61 and 62, so that injection of the liquid from the liquid bottle 75 into the accommodation chamber 26 continues.

When the liquid level L1 of the liquid injected into the accommodation chamber 26 reaches the full level, the delivery port 27B is blocked by the liquid. Accordingly, gas-liquid exchange through the two injection flow paths 61 and 62 becomes impossible. As a result, the injection of the liquid from the liquid bottle 75 into the accommodation chamber 26 stops.

Here, if the atmosphere communication flow paths 25 are not closed at the time of the liquid injection, since a state in which the inside of the accommodation chamber 26 communicates with atmosphere is maintained, the gas-liquid exchange would continue even if the liquid injected from the liquid bottle 75 into the accommodation chamber 26 exceeds the full level. Therefore, injection of the liquid from the liquid bottle 75 into the accommodation chamber 26 would continue. As a result, there is a risk that the liquid would overflow from the accommodation chamber 26. On the other hand, in the present embodiment, when the cover 22 is opened, the control section 90 predicts liquid injection and drives the motor 43M to switch the opening and closing mechanism 40 to the third switching position or the fourth switching position to close the atmosphere communication flow paths 25, so that the inside of the accommodation chamber 26 does not communicate with atmosphere through the atmosphere communication flow paths 25.

As a result, when the liquid level L1 in the accommodation chamber 26 reaches the full level at the time of liquid injection, the delivery port 27B of the two injection flow paths 61 and 62 is blocked by the liquid, and thus the gas-liquid exchange stops. As a result, when the liquid level L1 reaches the full level, the injection of the liquid from the liquid bottle 75 into the accommodation chamber 26 automatically stops.

Therefore, the user can leave the accommodation chamber 26 until it is full without monitoring the amount of liquid supplied to the accommodation chamber 26. Therefore, it is possible to avoid a situation in which the liquid overflows from the injection port 27A and so is wastefully consumed or the liquid ejection apparatus 11 becomes contaminated with the liquid such as ink, which may occur in a case where the liquid is continuously supplied from the inside of the accommodation chamber 26 even when the liquid exceeds the full level.

In step S43, the control section 90 determines whether a cover closing operation is detected. The control section 90 detects a cover closing operation when the cover sensor 71 is switched from ON to OFF. When a cover closing operation is detected, the control section 90 proceeds to step S44, and when a cover closing operation is not detected, the control section 90 stands by until a cover closing operation is detected.

In step S44, the control section 90 controls the opening and closing mechanism 40 to open the atmosphere communication flow paths 25. The control section 90 switches the opening and closing mechanism 40 to, for example, the first switching position.

Effects of Embodiment

Effects of the embodiment will be described.

(1) The liquid ejection apparatus 11 includes the liquid ejection section 31 that performs printing by ejecting liquid from the nozzles 33, the liquid containers 23 that include the accommodation chamber 26 and the injection port 27A, the supply flow paths 24 that bring the liquid ejection section 31 into communication with the liquid containers 23, and the opening and closing mechanism 40. The opening and closing mechanism 40 is configured such that an open state, in which the supply flow paths 24 are open, and a closed state, in which the supply flow paths 24 are closed, can be switched between when the power is on and cannot be switched between when the power is off. The liquid ejection apparatus 11 is configured to enable selection of a first mode in which, when power is turned off, power is turned off with the opening and closing mechanism 40 in the open state and a second mode in which, when power is turned off, power is turned off with the opening and closing mechanism 40 in the closed state. According to this configuration, maintaining the closed state at the time of the power-off and maintaining the open state at the time of the power-off can be freely selected according to the situation, and it is possible to prevent the selected state from being changed intentionally or erroneously by a user, a transporter, a repairman, or the like at the time of the power-off.

(2) In the liquid ejection apparatus 11, the second mode is selected when there is a command to transport the liquid ejection apparatus 11, and the first mode is selected when there is no command to transport the liquid ejection apparatus 11. According to this configuration, since the second mode is selected when a command to transport is received, so it is possible to suppress leakage of liquid such as ink during transport.

(3) In the liquid ejection apparatus 11, when the second mode is selected, the opening and closing mechanism 40 switches from the closed state to the open state during the period from the next power-on timing to the start of consumption of the liquid by the liquid ejection section 31. According to this configuration, it is possible to prevent forgetting to open the supply flow paths 24 after transportation.

(4) The liquid ejection apparatus 11 includes the carriage 30 on which the liquid ejection section 31 is mounted and which is movable in the main scanning direction X. The liquid ejection section 31 is attachably and detachably provided with respect to the carriage 30. One end of each supply flow path 24 is provided so as to be attachable to and detachable from the liquid ejection section 31. When there is a command to exchange the liquid ejection section 31, the opening and closing mechanism 40 closes the supply flow paths 24. According to this configuration, it is possible to prevent the liquid in the supply flow path 24 from moving when the liquid ejection section 31 is removed.

(5) The liquid containers 23 include the atmosphere communication flow paths 25 capable of communicating the inside of the accommodation chamber 26 with atmosphere. The opening and closing mechanism 40 is configured to open and close the atmosphere communication flow paths 25. According to this configuration, a plurality of flow paths can be opened and closed by the single opening and closing mechanism 40.

(6) A state in which the opening and closing mechanism 40 closes only the supply flow paths 24 and a state in which the opening and closing mechanism 40 closes only the atmosphere communication flow paths 25 are selectable. According to this configuration, switching between opening and closing can be performed according to the situation.

(7) The liquid ejection section 31 is attachably and detachably provided with respect to the carriage 30. One end of each supply flow path 24 is provided so as to be attachable to and detachable from the liquid ejection section 31. When there is a command to exchange the liquid ejection section 31, the opening and closing mechanism 40 closes at least the supply flow paths 24. According to this configuration, it is possible to prevent the liquid in the supply flow path 24 from moving when the liquid ejection section 31 is removed.

(8) When there is a command to replace the liquid ejection section 31, the opening and closing mechanism 40 closes at least the atmosphere communication flow paths 25. According to this configuration, it is possible to prevent the liquid in the supply flow path 24 from moving when the liquid ejection section 31 is removed.

(9) The liquid ejection apparatus 11 further includes the carriage 30 that includes the liquid ejection section 31 and is movable in the main scanning direction X. When there is a command to replace the liquid ejection section 31, the carriage 30 moves the liquid ejection section 31 to the exchange position EP where the liquid ejection section 31 can be exchanged. According to this configuration, it is possible to suppress the liquid ejection section 31 from being separated at an unexpected position.

(10) The liquid ejection apparatus 11 further includes the cap 51 as an example of a closed space formation section that is capable of forming a closed space into which the nozzles 33 open, at the standby position HP at which the liquid ejection section 31 is capable of standing by. When there is a command to turn off the power while the carriage 30 is at the exchange position EP, the carriage 30 moves the liquid ejection section 31 to the standby position HP. According to this configuration, the evaporation of the liquid from the liquid ejection section 31 can be suppressed.

(11) The liquid ejection apparatus 11 further includes the motor 43M configured to drive the opening and closing mechanism 40. The opening and closing mechanism 40 includes the first opening and closing section 41 that can open and close the supply flow paths 24, and the first cam 44 that by drive of the motor 43M switches opening and closing of the first opening and closing section 41. According to this configuration, it is possible to easily switch between maintaining the closed state when the power is turned off and maintaining the open state when the power is turned off.

(12) The opening and closing mechanism 40 includes the first opening and closing section 41 that can open and close the supply flow paths 24, the second opening and closing section 42 that can open and close the atmosphere communication flow path 25, the first cam 44 that by drive of the motor 43M switches opening and closing of the first opening and closing section 41, and the second cam 45 that by drive of the motor 43M switches opening and closing of the second opening and closing section 42. According to this configuration, it is possible to easily switch the plurality of opening and closing sections between the closed state being maintained at the time of power-off and the open state being maintained at the time of power-off.

(13) The liquid ejection apparatus 11 further includes the cover 22 configured to be displaced between a cover position covering the liquid containers 23 and an exposed position exposing the liquid containers 23. With the displacement of the cover 22 from the cover position to the exposed position, the opening and closing mechanism 40 closes at least the atmosphere communication flow paths 25. According to this configuration, the liquid can be injected in a state in which the liquid containers 23 are not open to atmosphere.

Modifications

The present embodiment can be modified as follows. The present embodiment and the following modifications can be implemented in combination with each other within a range that is not technically contradictory.

Figure 17:
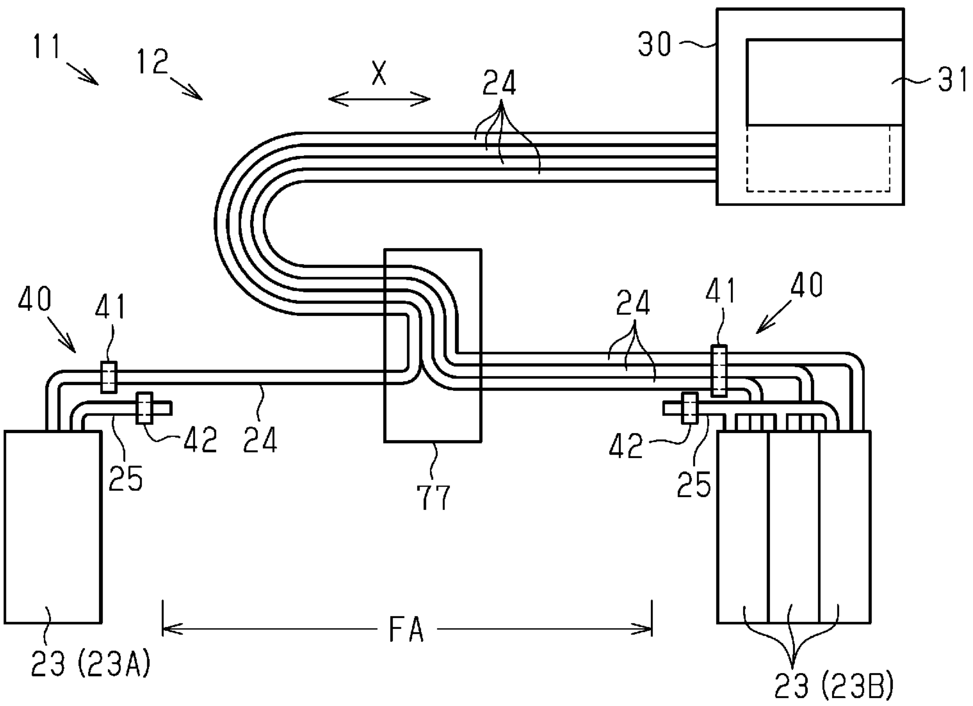
FIG. 17 is a schematic diagram showing a liquid container, a supply flow path, an atmosphere communication flow path, an opening and closing mechanism, a liquid ejection section, and the like in a modification.

As shown in FIG. 17, the opening and closing mechanism 40 may include first opening and closing sections 41 for opening and closing the supply flow paths 24, one for each of the liquid containers 23 provided on either side of the transport region FA in the main scanning direction X. The opening and closing mechanism 40 may include second opening and closing sections 42 for opening and closing the atmosphere communication flow paths 25, one for each of the liquid containers 23 on either side of the transport region FA in the main scanning direction X. In the above-described embodiment, the merged flow path formed by merging the plurality of atmosphere communication flow paths 25 is opened and closed by the opening and closing mechanism 40, but each of the atmosphere communication flow paths 25 may be individually opened and closed by the opening and closing mechanism 40. In this case, as shown in FIG. 17, since it is not necessary to route the atmosphere communication flow paths 25 to the position of a flow path holding section 77, which bundles and holds all the supply flow paths 24 at a position in the housing 14A close to the center in the main scanning direction X, it is possible to simplify the structure of the atmosphere communication mechanism.

Figure 18:
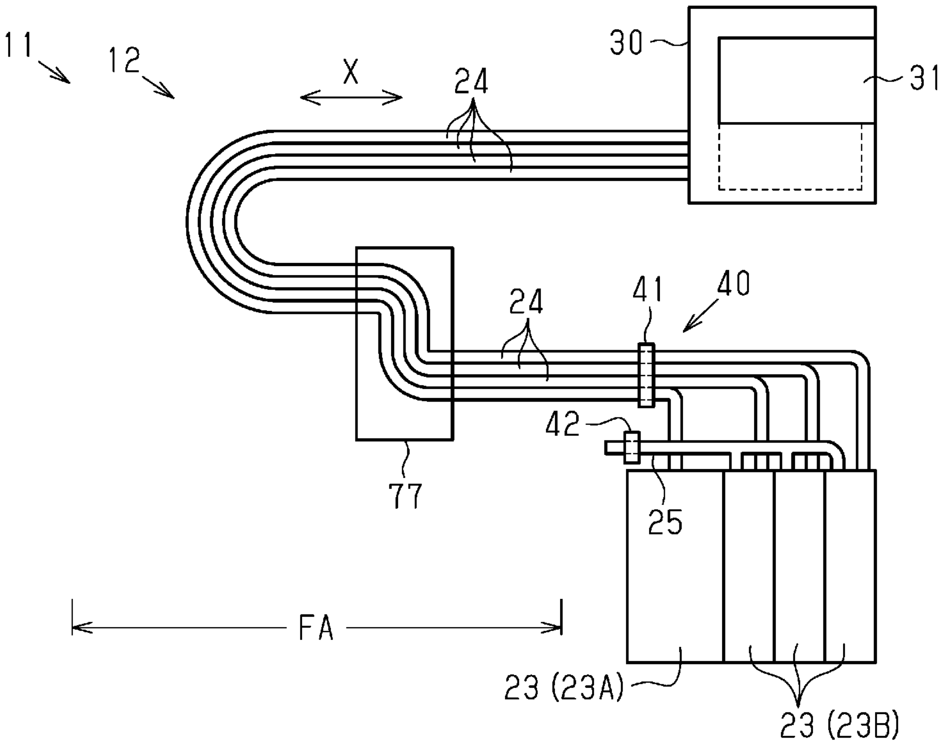
FIG. 18 is a schematic diagram showing a liquid container, a supply flow path, an atmosphere communication flow path, an opening and closing mechanism, a liquid ejection section, and the like in a modification different from FIG. 17.

As shown in FIG. 18, all the liquid containers 23 may be disposed on one side of the transport region FA in the main scanning direction X, and a common first opening and closing section 41 that opens and closes the supply flow paths 24 may be provided for all the liquid containers 23. In addition, a common second opening and closing section 42 that opens and closes the atmosphere communication flow paths 25 may be provided for all the liquid containers 23.

The opening and closing mechanism 40 may be configured to open and close only the supply flow paths 24. In this case, the following operations (a) to (d) may be performed.

(a) The supply flow path 24 is closed at the time of a transportation command, and the closed state is maintained even when the power is turned off.

(b) The supply flow path 24 is closed at the time of a command to exchange the liquid ejection section 31.

(c) When there is a command to inject liquid, the supply flow path 24 is closed.

(d) It is assumed that liquid is to be injected when the cover 22 is displaced from the cover position to the exposed position, and the supply flow path 24 is closed.

When the opening and closing mechanism 40 is configured to be able to open and close the supply flow paths 24 and the atmosphere communication flow paths 25, the following operations (1) to (11) may be performed.

(1) Only the supply flow path 24 is closed when a transport command is received, and the closed state is maintained even at the time of power-off.

(2) The supply flow path 24 and the atmosphere communication flow path 25 are closed when a transport command is received, and the closed state is maintained even at the time of power-off.

(3) Only the supply flow path 24 is closed when a command to exchange the liquid ejection section 31 is issued.

(4) Only the atmosphere communication flow path 25 is closed at the time of a command to exchange the liquid ejection section 31.

(5) Both the supply flow path 24 and the atmosphere communication flow path 25 are closed at the time of a command to exchange the liquid ejection section 31.

(6) When there is a command to inject liquid, only the supply flow path 24 is closed.

(7) When there is a command to inject liquid, only the atmosphere communication flow path 25 is closed.

(8) When there is a command to inject liquid, both the supply flow path 24 and the atmosphere communication flow path 25 are closed.

(9) With the displacement of the cover 22 from the cover position to the exposed position, it is assumed that liquid is to be injected, and only the atmosphere communication flow path 25 is closed.

(10) With the displacement of the cover 22 from the cover position to the exposed position, it is assumed that liquid is to be injected, and only the supply flow path 24 is closed.

(11) With the displacement of the cover 22 from the cover position to the exposed position, it is assumed that liquid is to be injected, and both the supply flow path 24 and the atmosphere communication flow path 25 are closed.

"Closing of the flow path in accordance with displacement of the cover" when a displacement detection section (for example, the cover sensor 71) detects the displacement of the cover 22 is not limited to a configuration in which the flow path is closed by a separate drive mechanism (for example, the motor 43M), and the flow path may be closed by the opening and closing mechanism 40 being linked with displacement of the cover 22. At least the second opening and closing section 42 of the opening and closing mechanism 40 may be configured to operate in conjunction with movement of the cover 22. For example, at least the atmosphere communication flow path 25 may be closed by operating the second cam 45 in conjunction with the movement of the cover 22 as the cover 22 is displaced from the cover position to the exposed position.

Various commands may be executed from the operation section 15 (an operation panel, an operation button, or the like) included in the liquid ejection apparatus 11, may be executed from various terminals (for example, the host device 100), or may be executed from both.

The opening and closing mechanism 40 may be provided in front of or behind the movement path of the carriage 30.

When the liquid containers 23 are provided on both sides of the transport path, the opening and closing mechanism 40 may be provided in a portion where the supply flow paths 24 and the atmosphere communication flow paths 25 are gathered in a single region. In this case, it is preferable that the single region is provided near the center in the width direction X, that is, at a position overlapping with the transport region FA in the vertical direction Z.

In a case where the liquid containers 23 are provided on both sides of the transport region FA, the opening and closing mechanism 40 and the drive unit (for example, the motor 43M) may be provided on both sides of the transport region FA, or only the opening and closing mechanism 40 may be provided on both sides of the transport region FA, and the opening and closing of the opening and closing mechanism 40 may be switched by transmitting drive from a single drive unit to the opening and closing mechanism 40 via the drive transmission section 43A.

When the opening and closing mechanism 40 includes the first opening and closing section 41 and the second opening and closing section 42, the first opening and closing section 41 and the second opening and closing section 42 may be driven by separate drive mechanisms 43. For example, the first cam 44 of the first opening and closing section 41 and the second cam 45 of the second opening and closing section 42 may be driven by separate motors 43M.

Although the first cam 44 of the first opening and closing section 41 and the second cam 45 of the second opening and closing section 42 are coaxially arranged, they may be arranged on separate axes parallel to each other or on separate axes intersecting each other.

The motor 43M may also serve as a motor related to the transport of the medium M, or may also serve as a motor related to the maintenance of the liquid ejection section 31.

In the case of the configuration in which the supply flow paths 24 are closed in the power-off state, the opening or closing state of the atmosphere communication flow paths 25 may be changed in conjunction with operation of a manual operation section or movement of the cover 22. For example, gas-liquid exchange between the liquid bottle 75 and the accommodation chamber 26 may be automatically stopped when the liquid is injected into a liquid container 23 by closing the atmosphere communication flow path 25 which is in an open state in a power-off state by an operation of the manual operation section. According to this configuration, it is possible to suppress liquid leakage from the nozzles 33 caused by a pressure change accompanying the atmospheric pressure change in the accommodation chamber 26 of the liquid containers 23 in the power-off state, and it is possible to easily and appropriately perform the injection of the liquid into the liquid containers 23 in the power-off state.

The opening and closing mechanism 40 may be driven by a drive section other than the motor 43M.

It is preferable that the drive mechanism 43 (a drive section such as the motor 43M, the drive transmission section 43A that transmits a driving force by a drive unit, and the like) of the opening and closing mechanism 40 is covered with a cover member or the like so as not to be exposed. According to this configuration, it is possible to prevent a user, a transporter, a repairman, or the like from forcibly opening and closing the opening and closing mechanism when the power is turned off, and it is possible to prevent the user, the transporter, the repairman, or the like from touching the opening and closing mechanism 40 while the opening and closing mechanism 40 is operating.

When the liquid ejection apparatus 11 is powered on, the opening and closing mechanism 40 may be capable of opening and closing both in the state where the cover 22 is opened and in the state where the cover 22 is closed. The opening and closing mechanism 40 may be configured to be openable and closable in any state as long as the power is on.

When the power of the liquid ejection apparatus 11 is on, the opening and closing mechanism 40 may be capable of opening and closing while the cover 22 is in a closed state, and may be incapable of opening and closing while the cover 22 is in an open state. According to this configuration, it is possible to suppress a concern that a user, a transporter, a repairman, or the like touches the opening and closing mechanism 40 during operation of the opening and closing mechanism 40.

The cover for switching the opened and closed state of the opening and closing mechanism 40 according to the displacement from the cover position to the exposed position is not limited to the cover 22 of the liquid storage units 20, and may be the cover 13A opened and closed with respect to the upper surface opening of the device main body 14. That is, the open and closed state of the opening and closing mechanism 40 may be switched according to the displacement of the cover 13A from the cover position to the exposed position. For example, the second opening and closing section 42 of the opening and closing mechanism 40 may switch the atmosphere communication flow paths 25 from the open state to the closed state in accordance with the displacement of the cover 13A from the cover position to the exposed position. According to this configuration, when the cover 13A (scanner 13) is opened to expose the inside of the device main body 14 in order to exchange the liquid ejection section 31, the atmosphere communication flow paths 25 are closed in accordance with the displacement at this time of the cover 13A from the cover position to the exposed position. Therefore, it is possible to suppress liquid leaking from the end section of the supply flow path 24 removed when the supply flow path 24 is removed from the liquid ejection section 31 at the joint section 35 at the time of exchanging the liquid ejection section 31.

In a case where the opening and closing mechanism 40 is capable of performing both opening and closing by the drive mechanism 43 and manual opening and closing, switching between opening and closing may be disabled by providing a configuration that locks the operation of the manual operation section when the power is off.

The opening and closing detection section 72 may not be provided.

An operation for switching the opening and closing mechanism 40 to the open state may be performed each time the power is turned on or the consumption of liquid by the liquid ejection section 31 is started after the power is turned on. Accordingly, it is possible to suppress the occurrence of a switching failure of the opening and closing mechanism 40 to the open state in a case where the opening and closing detection section 72 is not provided, a case where the opening and closing detection section 72 fails, a case where the control section 90 fails and it becomes unclear that the mode is the transport mode, or the like.

The liquid ejection apparatus 11 is not limited to an inkjet printer that discharges a liquid such as ink to a medium M such as paper, and may be a textile printing apparatus that discharges a liquid such as ink to a fabric.

The liquid ejection apparatus 11 is not limited to a serial printer, and may be a line printer or a page printer.

The liquid ejection apparatus 11 may be a printer having only a printing function without including the scanner 13 (image reading unit).

Hereinafter, technical ideas derived from the above-described embodiments and modifications and effects thereof will be described.

(A) A liquid ejection apparatus includes a liquid ejection section configured to print by discharging a liquid from a nozzle, a liquid container having an accommodation chamber that stores liquid and an injection port that communicates with the accommodation chamber and into which the liquid is configured to be injectable from the outside, a supply flow path communicating between the liquid ejection section and the liquid container, and an opening and closing mechanism that is configured to switch such that an open state in which the supply flow path is opened and a closed state in which the supply flow path is closed when power is turned on and not to switch when power is turned off. The liquid ejection apparatus is configured to enable selection of a first mode in which, when power is turned off, power is turned off with the opening and closing mechanism in the open state and a second mode in which, when power is turned off, power is turned off with the opening and closing mechanism in the closed state.

According to this configuration, maintaining the closed state at the time of the power-off and maintaining the open state at the time of the power-off can be freely selected according to the situation, and it is possible to prevent the selected state from being changed intentionally or erroneously by a user, a transporter, a repairman, or the like at the time of the power-off.

(B) In the liquid ejection apparatus, when there is a command to transport the liquid ejection apparatus, the second mode may be selected and when there is no command to transport the liquid ejection apparatus, the first mode may be selected.

According to this configuration, since the second mode is selected when a command to transport is received, so it is possible to suppress leakage of liquid such as ink during transport.

(C) In the liquid ejection apparatus, when the second mode is selected, the opening and closing mechanism may switch from the closed state to the open state during the period from the next power-on timing to the start of consumption of the liquid by the liquid ejection section.

According to this configuration, it is possible to prevent forgetting to open the supply flow paths 24 after transportation.

(D) The liquid ejection apparatus may further include a carriage that has the liquid ejection section and is movable in a main scanning direction, wherein the liquid ejection section is detachably attached to the carriage, one end of the supply flow path is detachably attached to the liquid ejection section, and the opening and closing mechanism closes the supply flow path when a command to exchange the liquid ejection section is issued.

According to this configuration, it is possible to prevent the liquid in the supply flow path from moving when the liquid ejection section is separated.

(E) In the liquid ejection apparatus, the liquid container may include an atmosphere communication flow path capable of communicating the inside of the accommodation chamber with atmosphere, and the opening and closing mechanism may be configured to be capable of opening and closing the atmosphere communication flow path.

According to this configuration, a plurality of flow paths can be opened and closed by one opening and closing mechanism.

(F) In the liquid ejection apparatus, a state in which the opening and closing mechanism closes only the supply flow path and a state in which the opening and closing mechanism closes only the atmosphere communication flow path can be selected.

According to this configuration, switching between opening and closing can be performed according to the situation.

(G) The liquid ejection apparatus further includes a carriage on which the liquid ejection section is mounted and which is movable in the main scanning direction, wherein the liquid ejection section is detachably attached with respect to the carriage, and wherein one end of the supply flow path is detachably attached with respect to the liquid ejection section.

When there is a command to replace the liquid ejection section, the opening and closing mechanism may close at least the supply flow path.

According to this configuration, it is possible to prevent the liquid in the supply flow path from moving when the liquid ejection section is separated.

(H) The liquid ejection apparatus further includes a carriage mounted with the liquid ejection section and movable in the main scanning direction, wherein the liquid ejection section is detachably attached with respect to the carriage, and wherein one end of the supply flow path is detachably attached with respect to the liquid ejection section.

The opening and closing mechanism may close at least the atmosphere communication flow path when there is a command to replace the liquid ejection section.

According to this configuration, it is possible to prevent the liquid in the supply flowpath from moving when the liquid ejection section is separated.

(I) The liquid ejection apparatus may further include a carriage that has the liquid ejection section and is movable in a main scanning direction, and the carriage may move the liquid ejection section to an exchange position at which the liquid ejection section is exchangeable when a command to exchange the liquid ejection section is issued.

According to this configuration, it is possible to suppress the liquid ejection section from being separated at an unexpected position.

(J) The liquid ejection apparatus may further include a closed space formation section that is capable of forming a closed space in which the nozzle opens, at a standby position at which the liquid ejection section is capable of standing by, and the carriage may move the liquid ejection section to the standby position when there is a command to turn off power while the carriage is at the exchange position.

According to this configuration, evaporation of the liquid from the liquid ejection section can be suppressed.

(K) The liquid ejection apparatus may further include a motor configured to drive the opening and closing mechanism, and the opening and closing mechanism may have a first opening and closing section configured to open and close the supply flow path and a first cam configured to switch opening and closing of the first opening and closing section by the motor drive.

According to this configuration, it is possible to easily switch between maintaining the closed state when the power is turned off and maintaining the open state when the power is turned off.

(L) The liquid ejection apparatus may further include a motor configured to drive the opening and closing mechanism, the opening and closing mechanism has a first opening and closing section configured to open and close the supply flow path, a second opening and closing section configured to open and close the atmosphere communication flow path, a first cam configured to switch between opening and closing of the first opening and closing section by driving of the motor, and a second cam configured to switch between opening and closing of the second opening and closing section by driving of the motor.

According to this configuration, it is possible to easily switch the plurality of opening and closing sections between the closed state being maintained at the time of power-off and the open state being maintained at the time of power-off.

(M) The liquid ejection apparatus may further include a cover configured to be displaced between a cover position covering the liquid container and an exposed position exposing the liquid container, and the opening and closing mechanism may close at least the atmosphere communication flow path in response to displacement of the cover from the cover position to the exposed position.

According to this configuration, it is possible to inject the liquid in a state where the liquid container is not open to the atmosphere.

What is claimed is:

1. A liquid ejection apparatus comprising:

a liquid ejection section configured to print by ejecting a liquid from a nozzle;

a liquid container including an accommodation chamber configured to store liquid and an injection port that communicates with the accommodation chamber and that is configured to be injected with liquid from outside;

a supply flow path communicating between the liquid ejection section and the liquid container; and an opening and closing mechanism configured to, when power is turned on, enable, and, when power is turned off, disable switching between an open state, in which the supply flow path is open, and a closed state, in which the supply flow path is closed, wherein the liquid ejection apparatus is configured to enable selection of a first mode in which, when power is turned off, power is turned off with the opening and closing mechanism in the open state, and a second mode in which, when power is turned off, power is turned off with the opening and closing mechanism in the closed state, when there is a command to transport the liquid ejection apparatus, the second mode is selected, and when there is no command to transport the liquid ejection apparatus, the first mode is selected.

2. The liquid ejection apparatus according to claim 1, wherein when the second mode is selected, the opening and closing mechanism switches from the closed state to the open state in a period from when power is next turned on to when consumption of the liquid by the liquid ejection section is started.

3. The liquid ejection apparatus according to claim 1, further comprising:

a carriage on which the liquid ejection section is mounted and that is configured to move in a main scanning direction, wherein the liquid ejection section is attachable to and detachable from the carriage, the supply flow path is provided such that one end is attachable to and detachable from the liquid ejection section, and when there is a command to replace the liquid ejection section, the opening and closing mechanism closes the supply flow path.

4. The liquid ejection apparatus according to claim 1, further comprising:

a motor configured to drive the opening and closing mechanism, wherein the opening and closing mechanism includes a first opening and closing section configured to open and close the supply flow path and a first cam configured to switch an opening state and a closing state of the first opening and closing section by drive of the motor.

5. The liquid ejection apparatus according to claim 1, wherein the liquid container has an atmosphere communication flow path configured to communicate inside of the accommodation chamber with atmosphere and the opening and closing mechanism is configured to open and close the atmosphere communication flow path.

6. The liquid ejection apparatus according to claim 5, configured to enable selection of a state in which the opening and closing mechanism closes only the supply flow path and a state in which the opening and closing mechanism closes only the atmosphere communication flow path.

7. The liquid ejection apparatus according to claim 5, further comprising:

a motor configured to drive the opening and closing mechanism, wherein the opening and closing mechanism includes a first opening and closing section configured to open and close the supply flow path, a second opening and closing section configured to open and close the atmosphere communication flow path, a first cam configured to switch the opening state and the closing state of the first opening and closing section by drive of the motor, and a second cam configured to switch the opening state and the closing state of the second opening and closing section by drive of the motor.

8. The liquid ejection apparatus according to claim 5, further comprising:

a cover configured to be displaced between a cover position at which the liquid container is covered and an exposed position at which the liquid container is exposed, wherein when the cover is displaced from the cover position to the exposed position, the opening and closing mechanism closes at least the atmosphere communication flow path.

9. The liquid ejection apparatus according to claim 5, further comprising:

a carriage on which the liquid ejection section is mounted and that is configured to move in a main scanning direction, wherein the liquid ejection section is attachable to and detachable from the carriage, the supply flow path is provided such that one end is attachable to and detachable from the liquid ejection section, and when there is a command to replace the liquid ejection section, the opening and closing mechanism closes at least the atmosphere communication flow path.

10. The liquid ejection apparatus according to claim 9, wherein when there is a command to replace the liquid ejection section, the carriage moves the liquid ejection section to an exchange position where the liquid ejection section is replaceable.

11. The liquid ejection apparatus according to claim 10, further comprising:

a closed space formation section configured to form, at a standby position where the liquid ejection section is configured to stand by, a closed space into which the nozzle opens, wherein when there is a command to turn off power when the carriage is at the exchange position, the carriage moves the liquid ejection section to the standby position.

12. The liquid ejection apparatus according to claim 5, further comprising:

a carriage on which the liquid ejection section is mounted and that is configured to move in a main scanning direction, wherein the liquid ejection section is attachable to and detachable from the carriage, the supply flow path is provided such that one end is attachable to and detachable from the liquid ejection section, and when there is a command to replace the liquid ejection section, the opening and closing mechanism closes at least the supply flow path.

13. The liquid ejection apparatus according to claim 12, wherein when there is a command to replace the liquid ejection section, the carriage moves the liquid ejection section to an exchange position where the liquid ejection section is replaceable.

14. The liquid ejection apparatus according to claim 13, further comprising:

a closed space formation section configured to form, at a standby position where the liquid ejection section is configured to stand by, a closed space into which the nozzle opens, wherein when there is a command to turn off power when the carriage is at the exchange position, the carriage moves the liquid ejection section to the standby position.

* * * * *